(12) United States Patent
Yoshikawa et al.

(10) Patent No.: US 6,837,910 B1
(45) Date of Patent: Jan. 4, 2005

(54) APPARATUS AND METHOD FOR GASIFYING LIQUID OR SOLID FUEL

(75) Inventors: Kunio Yoshikawa, Sagamihara (JP); Tsutomu Yasuda, Yokohama (JP); Masaru Sakai, Tokyo (JP); Toru Ishii, Tokyo (JP)

(73) Assignees: Japan Science and Technology Agency, Saitama-Ken (JP); Nippon Furnace Kogyo Kaisha, Ltd., Kanagawa-Ken (JP); Ishikawajima-Harima Heavy Industries Co., Ltd., Tokyo (JP)

(*) Notice: Subject to any disclaimer, the term of this patent is extended or adjusted under 35 U.S.C. 154(b) by 277 days.

(21) Appl. No.: 10/070,432

(22) PCT Filed: Sep. 19, 2000

(86) PCT No.: PCT/JP00/06387
§ 371 (c)(1),
(2), (4) Date: Jul. 22, 2002

(87) PCT Pub. No.: WO01/21735
PCT Pub. Date: Mar. 29, 2001

(30) Foreign Application Priority Data

Sep. 20, 1999 (JP) ............................................. 11/266168

(51) Int. Cl.[7] ................................ C10J 3/16; C01B 3/36
(52) U.S. Cl. ..................................... 48/197 FM; 48/64
(58) Field of Search ....................... 48/61, 62 R, 71–73, 48/75–78, 63, 64, 89, 98–101, 102 R, 105, 106, 107, 102 A, 108, 111, 112, 93–95, 119, 197 R, 200–202, 204, 209–213, 214 R, 215, 214 A, 197 FM; 422/188, 189, 193, 198, 200–204, 211

(56) References Cited

U.S. PATENT DOCUMENTS

| 4,057,402 A | * | 11/1977 | Patel et al. ................ 48/197 R |
| 4,184,322 A | | 1/1980 | Paull et al. |
| 4,337,066 A | * | 6/1982 | Kunii ............................. 48/63 |
| 4,426,810 A | | 1/1984 | Rudolph et al. |
| 6,190,429 B1 | * | 2/2001 | Fujimura et al. ......... 48/197 R |

FOREIGN PATENT DOCUMENTS

| DE | 3 242699 | 7/1984 |
| EP | 0 583211 | 2/1994 |
| EP | 0 763485 | 10/1996 |

* cited by examiner

Primary Examiner—Samuel M. Heinrich
(74) Attorney, Agent, or Firm—Dennison, Schultz, Dougherty & MacDonald

(57) ABSTRACT

A gasifying apparatus comprises a gasifier, a reformer and a heating device. The gasifier produces a thermal decomposed gas with use of a thermal decomposition reaction of a liquid or solid fuel such as waste or coal, and the heating device heats a low-temperature steam and air so as to be a high-temperature steam and air, which have a temperature equal to or higher than 700 deg. C. The gasifying apparatus has feeding means including fluid passages for feeding the high-temperature steam and air to the gasifier and the reformer. In a thermal decomposition area of the gasifier, the liquid or solid fuel is thermally decomposed to produce the thermal decomposed gas with sensible heat of the high-temperature steam and air and with the heat generated by an exothermic oxidation reaction between the high-temperature air and the liquid or solid fuel. In the reformer, the thermal decomposed gas is reformed in the existence of the high-temperature steam so as to be a high-temperature syngas. The steam reforming reaction of the liquid or solid fuel is carried out with an exothermic reaction between the high-temperature air and hydrocarbon contained in the thermal decomposed gas and with an endothermic reaction between the hydrocarbon and the high-temperature steam.

29 Claims, 15 Drawing Sheets

(A)

(B)

APPARATUS AND METHOD FOR GASIFYING LIQUID OR SOLID FUEL

TECHNICAL FIELD OF THE INVENTION

The present invention relates to an apparatus and method for gasifying liquid or solid fuel and, more specifically, to such an apparatus and method for producing a relatively high-quality syngas by gasifying liquid or solid fuel, such as waste, coal, biomass fuel, heavy oil and so forth with a thermal decomposition reaction.

BACKGROUND OF THE INVENTION

There is known a solid-fuel gasifying system, in which a waste such as waste plastic, sludge, shredder dust, municipal refuse, or a solid fuel such as coal is introduced into a thermal decomposition furnace. The solid fuel is thermally decomposed into a thermal decomposed gas or pyrolysis gas within a high-temperature reducing atmosphere of less or low oxygen concentration. A variety of combustion furnaces or incinerators may be generally used as a the thermal decomposition furnace, such as a waste gasification melting furnace, a coal gasification furnace, a rotary kiln type of thermal decomposition furnace, an external heating type of thermal decomposition furnace, a batch type of thermal decomposition furnace or a self-burning type of decomposition furnace and so forth.

The present inventors have recently developed a waste gasification system comprising a high-temperature air generator for continuously providing an amount of hot air at a high temperature exceeding 800 degree centigrande (referred to as "deg. C" hereinafter), and a waste gasification type of melting furnace containing a number of spherical ceramic balls, which is so-called "pebbles". The high temperature air is introduced from the high-temperature air generator into the melting furnace, wherein the waste is melted and slagged on the spherical ceramic balls. Thermal decomposed gas or pyrolysis gas produced by thermal decomposition of waste is conducted out of the furnace and introduced into a gas treatment devices, such as a scrubbing devices and/or filtration equipments. The gas treatment devices remove various environmentally harmful substances, such as chloride, sulfur, heavy metal particles and unburned combustibles, from the thermal decomposed gas, and quickly cool down the thermal decomposed gas to avoid re-synthesis of dioxin. The thermal decomposed gas scrubbed, filtrated and cooled down is used as a relatively high-quality syngas to be fed to any of combustion facilities or heat engines, for example, a heating furnace such as a boiler or industrial furnace; an internal combustion engine such as a gas engine, gas turbine or diesel engine; or a variety of heat cycle systems.

As a current type of thermal decomposition gasification system, a system is known, which comprises a heat decomposition furnace for producing a quantity of thermal decomposed gas; a high-temperature gas treatment device such as a cracking device; and a gas scrubbing device for scrubbing and cooling the thermal decomposed gas. The thermal decomposition furnace functions to thermally decompose a liquid or solid fuel, such as waste or coal, under a low or less oxygen atmosphere of an internal combustion area in the furnace. The high-temperature gas treatment device cracks tar or oil contained in the thermal decomposed gas, and the gas scrubbing device is adapted to remove sulfur, dust, chloride and other harmful substances from the thermal decomposed gas while quickly cooling down the gas. Having taken such cracking and scrubbing treatments, the thermal decomposed gas is fed to a variety of combustion facilities as a cleaned up syngas.

In such a type of gasification system, a large amount of sensible heat of the thermal decomposed gas is lost in the scrubbing and cracking devices, so that the thermal efficiency of the whole system is degraded. In order to prevent such a heat loss, a steam reforming process is considered to be employed, in which steam is mixed with the thermal decomposed gas so as to reform the hydrocarbon in the thermal decomposed gas by means of a steam reforming reaction. Such a hydrocarbon steam reforming is, in general, an endothermic reaction which requires an amount of heat to be supplied to the area of reforming reaction by an external or internal combustion type of heating device.

The inventors have recently proposed an apparatus capable of continuously heating a quantity of steam up to a high temperature equal to or higher than 700 deg. C., which allows a study or research to be conducted with respect to applications of steam to be used as a high-temperature inert gas or a high-temperature heating medium. Particularly, as the high-temperature steam merely produces a quantity of water after its condensation, such an application of high-temperature steam is advantageous to simplification of treatment of residues after cooled down and condensed, which entirely differs from a case of use of the other inert gases such as nitrogen gas. In addition, the high-temperature steam at 700 deg. C. or higher, which possesses a large amount of sensible heat, acts to supply the reaction area with an amount of heat required for the reforming reaction at least partially.

However, it is found out that the heat of reaction required for the steam reforming reaction of the thermal decomposed gas cannot be sufficiently obtained even if the high-temperature steam exceeding 700 deg. C. is fed to the reaction area, and therefore, a simplified method or arrangement is desired to be developed, which can compensate for the shortage of heat required for the aforementioned reforming reaction.

Further, the present inventors has recognized a state in that the aforementioned waste gasification system may cause a relatively large quantity of soot to be produced within the furnace during the process of gasifying and melting the waste with the high-temperature air in a relatively oxygen-enriched condition. Thus, it is also desired to provide an approach which can efficiently restrict the generation or production of soot in the furnace.

Such being the case, the object of the present invention is to provide an apparatus and method for gasifying a liquid or solid fuel which can reform the thermal decomposed gas of a gasification furnace or thermal decomposition furnace so as to be a relatively high quality syngas.

Another object of the present invention is to provide an apparatus and method for gasifying a liquid or solid fuel which can ensure an amount of heat required for a steam reforming reaction of hydrocarbon in the thermal decomposed gas without provision of internal or external combustion type of heating devices.

Still another object of the present invention is to provide an apparatus and method for gasifying a liquid or solid fuel which can promote or urge the thermal decomposition and gasification of the fuel in a gasification furnace or thermal decomposition furnace while restricting production of soot in the thermal decomposition area.

DISCLOSURE OF THE INVENTION

The present inventors have found the fact that a desired syngas at a high temperature containing a relatively large quantity of carbon monoxide and hydrogen can be produced while the generation or production of soot is significantly restricted in the gasifying and melting process, in a case where both of air and steam at a high temperature exceeding 700 deg. C. are introduced into at least one of the thermal decomposition area of the solid or liquid fuel and the reforming area of the thermal decomposed gas.

In carrying out the above objects and other objects of the present invention, an apparatus for gasifying a liquid or solid fuel provided with a gasifier or thermal decomposition furnace which is capable of producing an amount of thermal decomposed gas with thermal decomposition of the fuel, constructed in accordance with the present invention, comprises steam and air heating means for heating low-temperature steam (or water) and low-temperature air to be a high-temperature steam and air at a temperature equal to or higher than 700 deg. C., and feeding means for feeding said high-temperature steam and air to a thermal decomposition area of the fuel and/or a reforming area of the thermal decomposed gas.

Further, in accordance with the present invention, a method for gasifying a liquid or solid fuel is provided, in which an amount of thermal decomposed gas is produced by thermal decomposition of the fuel, wherein water or low-temperature steam, and low-temperature air are heated to a temperature equal to or higher than 700 deg. C., and the high temperature steam and air thus heated are introduced into a thermal decomposition area of the fuel and/or a reforming area of the thermal decomposed gas.

According to the present invention, the high-temperature steam and air are introduced into at least one of the thermal decomposition area and the reforming area, so that the air takes an exothermic reaction with the decomposed gas whereas the steam takes an endothermic reaction with carbon compound in the decomposed gas. Introduction of an appropriate ratio of the air and steam thereinto allows a desired reaction to be carried out between the decomposed gas and the air or steam, whereby a relatively high quality raw syngas can be produced.

From another aspect of the present invention, an apparatus and method for gasifying a liquid or solid fuel are arranged in accordance with the present invention, wherein the aforementioned high temperature steam and air are introduced into the thermal decomposition area and/or the reforming area by the feeding means, so that the thermal decomposed gas is reformed to be a high temperature syngas by means of an endothermic reaction between the high temperature steam and a carbon compound in the thermal decomposed gas, as well as an exothermic reaction between the high temperature air and the carbon compound. The high temperature steam and air are mixed with the thermal decomposed gas, so that the heat obtained by the exothermic reaction between the air and the carbon compound compensates for the shortage of heat required for the endothermic reaction between the steam and the carbon compound. Therefore, an amount of heat for the steam reforming reaction can be ensured without provision of internal or external combustion type of heating devices.

From still another aspect of the present invention, an apparatus and method for gasifying a liquid or solid fuel is provided in accordance with the present invention, wherein the high temperature steam and air are introduced into the thermal decomposition area, and the fuel is thermally decomposed by the sensible heat of the high temperature steam and air as well as the heat of oxidization reaction between the high temperature air and the fuel, so that the thermal decomposed gas is produced. The high temperature steam and air cause the liquid or solid fuel to be thermally decomposed by means of the sensible heat of the steam and air and the heat of oxidization reaction, whereby the thermal decomposed gas is produced. With such an arrangement, the thermal decomposition and gasification of the liquid or solid fuel can be promoted or urged in the gasification furnace or thermal decomposition furnace without provision of internal or external combustion type of heating devices, while production of soot is restricted in the thermal decomposition area.

In this specification, the term reading "liquid or solid fuel" means solid, semi-solid or liquid fuels including a variety of wastes containing carbon compounds, coal, biomass fuels, heavy oil and the like. The concept of "carbon compound" includes a variety of combustible matters containing hydrocarbon, organic carbon compound or carbon. Further, air, oxygen, or mixture of air and oxygen is included in the concept of "air", and the term reading "low-temperature air" means air at an ambient temperature or a temperature attained by a conventional heater or heat exchanger, e.g., a temperature ranging from 0 deg. C. to 500 deg. C. Furthermore, the term reading "low-temperature steam" means steam or superheated steam having a temperature and pressure given by a conventional steam generation technology.

According to a preferred embodiment of the present invention, the low-temperature steam is mixed with the low-temperature air, and the mixture is then heated up to a temperature equal to or higher than 700 deg. C. by a steam/air heating device. The heated mixture is supplied to the thermal decomposition area or the reforming area. Preferably, the low-temperature steam and air may be mixed together under control of a mixing control device, and the mixture containing an appropriate ratio by weight of low-temperature steam is fed to the steam/air heating device.

According to another preferred embodiment of the present invention, each of the low-temperature steam and air is heated up to a temperature equal to or higher than 700 deg. C. by a steam heating device and an air heating device, respectively. The high-temperature steam and air are mixed with each other under control of the mixing control device, so that a high-temperature mixture containing an appropriate ratio by weight of low-temperature steam is fed to the thermal decomposition area or the reforming area.

Preferably, the mixing control device comprises a mixing control valve assembly or a group of control valve assemblies capable of appropriately regulating or adjusting the mixing ratio of the steam and air, and mixing ratio control means, such as an electronic control device for variably setting the mixing ratio.

According to still another embodiment of the present invention, the low-temperature steam is heated to a temperature equal to or higher than 700 deg. C. by the steam heating device and is introduced into thermal heat decomposition area or the reforming area through a steam supply line, whereas the low-temperature air is heated to a temperature equal to or higher than 700 deg. C. by the air heating device and is introduced through an air supply line into the thermal decomposition area or the reforming area. The high-temperature steam and air are mixed together within the thermal decomposition area or the reforming area.

The aforementioned high-temperature mixture or high-temperature steam and air are introduced into either or both of the thermal decomposition area and the reforming area, so that the high-temperature steam and air react upon the liquid or solid fuel as well as upon the carbon compound in the thermal decomposed gas. The thermal decomposed gas is reformed into a raw syngas containing hydrocarbon, hydrogen and carbon monoxide to be fed to a cooling device and a gas treatment device as a high-temperature raw syngas. Preferably, the sensible heat of the high-temperature syngas is used in the cooling device to evaporate water to be the low-temperature steam or to heat steam produced by a steam generator. Thus, the thermal efficiency in the whole system can be improved by effective heat recovery of the sensible heat of the high-temperature syngas.

According to a preferred embodiment of the present invention, the steam and air heating means comprises heat exchangers which can heat the low-temperature fluid (low-temperature air, steam or mixture of air and steam), a splitting area for splitting the heated fluid (high-temperature air, steam or mixture of air and steam) into first and second fluid streams, and a combustion area into which a combustible substance can be introduced. The second stream is conducted into the heat decomposition area and/or the reforming area whereas the first stream is conducted into the combustion area. The heat exchangers, combustion areas and splitting area are in communication with each other and the high-temperature combustion gas produced by a combustion reaction in the combustion area is exhausted through the heat exchanger. The heat exchanger comprises a regenerator which accumulates an amount of heat of the high-temperature combustion gas and radiates the heat to the low-temperature fluid. Preferably, the heat exchanger may be a honey-comb type of regenerator provided with a number of narrow flow passages through which the combustion gas and the low-temperature fluid can alternately pass. The details of such a honey-comb type of regenerator is disclosed in, for example, Japanese Patent Application No. 10-189 (Japanese Patent Laid-Open Publication No. 10-246428) and Japanese Patent Application No. 5-6911 (Japanese Patent Laid-Open Publication No. 6-213585). Alternatively, the heat exchanger may be a regenerative heat exchanger defined by a regenerator containing a number of pellets, pebbles, balls or the like.

According to another preferred embodiment of the present invention, the heating means may comprise a heat exchanger in a form of a recuperator, coil type of heat exchanger or fin tube type of heat exchanger. The heat exchanger heats water, low-temperature steam or low-temperature air to be air and steam at a mid-temperature or a high-temperature by heat exchange action with the high-temperature syngas. A quantity of water may be supplied to the heating means in a form of mist containing fine water droplets by a suitable water supply device, such as a spraying device. Alternatively, the heating means may comprise a steam boiler which can generates a quantity of high-temperature steam from water.

For instance, the gasifying apparatus includes cooling means for cooling the high-temperature syngas to be the low-temperature syngas. The cooling means comprises a high-temperature heat exchanger in which the low-temperature steam and/or low-temperature air is heated up to a temperature equal to or higher than 700 deg. C. by heat-exchange action with the high-temperature syngas, a mid-temperature heat exchanger in which the low-temperature steam and/or low-temperature air is heated up to a temperature in a range from 500 deg. C. to 700 deg. C. by heat-exchange action with the syngas, and a low-temperature heat exchanger or heat exchanger for steam generation in which the low-temperature steam is produced from a quantity of water with heat-exchange action between the syngas and the water. A dust collector, such as a ceramic filter, may be interposed between the cooling means and the gasifying means.

The cooling means may be defined by three types of coolers, and the coolers are provided with the high-temperature heat exchanger, the mid-temperature heat exchanger and the low-temperature heat exchanger, respectively. Alternatively, the cooling means is defined by two types of coolers, wherein the high-temperature heat exchanger and the mid-temperature heat exchanger are installed in the first cooler, and wherein the low-temperature heat exchanger is installed in the second cooler. In such a case, a desulfurizing, dechlorinating, denitrating or dust removing device can be interposed between the mid-temperature heat exchanger and the low-temperature heat exchanger in such a manner that acids and other harmful substances produced upon cooling of the syngas is removed from the gas.

The cleaned up or refined syngas produced by the gasifying apparatus of the present invention can be supplied as a main fuel to a combustion device of a combustion facility or engine, such as a burner or a combustor. If the heat energy of the combustion device is used to drive a power generator, the electrical energy can be supplied therefrom to an instruments or facilities out of the system. For example, if waste or refuse of a building or a plant is used as the liquid or solid fuel, the gasifying apparatus can be operatively associated with a gas turbine or a power generator so as to constitute a relatively compact co-generation system.

The cleaned up syngas of the gasifying apparatus according to the present invention can be supplied to the combustion device of the combustion facility or engine as being an auxiliary fuel to be added to the main fuel or combustion air for the combustion device. For example, if the gasifying apparatus of the aforementioned arrangement is used as an incinerator for waste or refuse in a ship or the like, the cleaned up syngas of the gasifying apparatus can be added to the main fuel or combustion air for the internal combustion engine of the ship so as to reduce the fuel consumption in the ship, as well as the waste or refuse in the ship can be incinerated.

The present invention can be generally applied to a waste or coal gasification system in which the waste or coal is used as the liquid or solid fuel. If an electric power generator is operatively associated with such a system, a combined cycle power generation system with use of waste or coal can be provided.

BEST MODE FOR CARRYING OUT THE INVENTION

Figure 1:
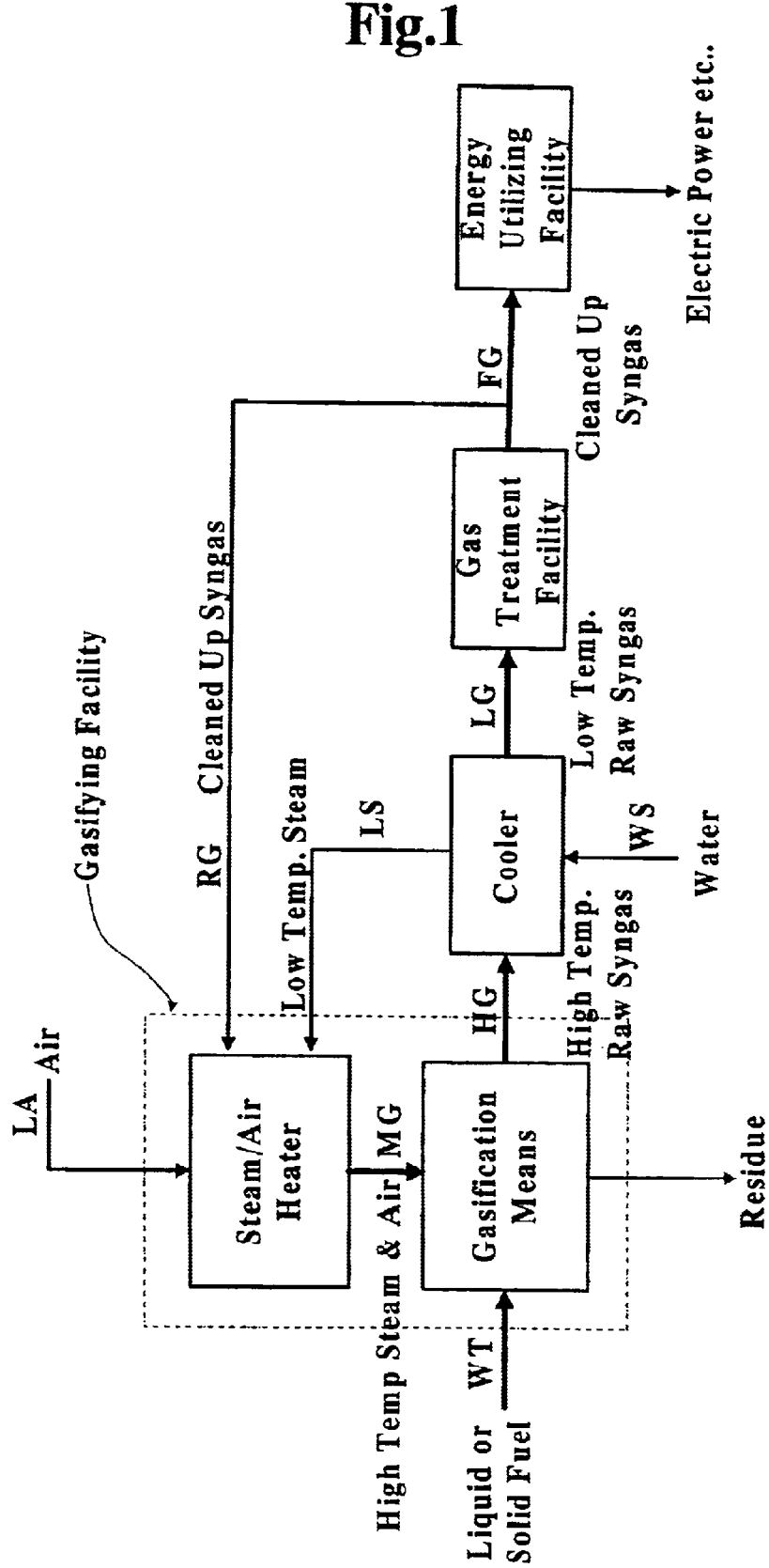
FIG. 1 is a system flow diagram generally illustrating an arrangement of a preferred embodiment of solid or liquid fuel gasifying apparatus according to the present invention.

FIG. 1 is a system flow diagram generally illustrating an arrangement of a preferred embodiment of solid or liquid fuel gasifying apparatus according to the present invention.

The solid or liquid fuel gasifying apparatus comprises gasificaition means for thermally decomposing a liquid or solid fuel, a gas cooler for cooling a high-temperature raw syngas delivered from the gasificaition means, a gas treatment facility for cleaning up or refining the raw syngas, and a steam/air heating device for feeding an amount of high-temperature steam and air to the thermal decomposition area or reforming area in the gasificaition means. A gasifying facility is defined by the gasificaition means and the steam/air heating device. The liquid or solid fuel, such as waste, coal or the like, is charged into the gasificaition means by fuel supply means WT. The low-temperature steam and air are heated by the steam/air heating device up to a temperature equal to or higher than 700 deg. C., preferably higher than 800 deg. C., and the high-temperature steam and air are fed to the gasificaition means as a gasifying agent and reforming agent. The liquid or solid fuel is thermally decomposed to be a thermal decomposed gas and residue in the gasificaition means in the existence of the high-temperature steam and air. A quantity of hydrocarbon contained in the thermal decomposed gas takes a reaction with the high-temperature steam and air to be reformed to the raw syngas containing hydrocarbon, carbon monoxide and hydrogen. In general, the reaction between hydrocarbon and high-temperature steam is an endothermic reaction as shown by the following formula (1), whereas the reaction between hydrocarbon and high-temperature air is an exothermic reaction as shown by the following formula (2):

$$C_xH_x + H_2O \rightarrow CO + H_2 + H_2O \quad (1)$$

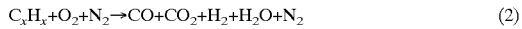
$$C_xH_x + O_2 + N_2 \rightarrow CO + CO_2 + H_2 + H_2O + N_2 \quad (2)$$

The high-temperature steam takes a reaction with the the thermal decomposed gas or pyrolysis gas produced by the thermal decomposition of the liquid or solid fuel, so that the gas is reformed to be a reformed gas, i.e., the high-temperature raw syngas, which contains a relatively large quantity of carbon monoxide and hydrogen. The heat generated by the exothermic reaction between hydrocarbon and high-temperature air is used as the heat required for the endothermic reforming reaction between the hydrocarbon and high-temperature steam.

The high-temperature raw syngas is fed to the gas cooler through a high-temperature gas delivery line HG. A water supply line WS is connected to the cooler, so that the water of the line WS is evaporated by a heat exchange action with the high-temperature gas so as to generate an quantity of superheated steam at a relatively low temperature, e.g., in a range between 150 deg. C. and 250 deg. C. The low-temperature steam is fed to the steam/air heating device through a low-temperature steam supply line LS so as to be heated up to a raised temperature equal to or higher than 700 deg. C., preferably higher than 800 deg. C., and thereafter, the high-temperature steam is introduced into the gasificaition means. Simultaneously, a quantity of low-temperature air at an ambient temperature is fed through a low-temperature air supply line LA to the steam/air heating device so as to be heated up to a raised temperature equal to or higher than 700 deg. C., preferably higher than 800 deg. C., and the high-temperature air is introduced into the gasificaition means.

The low-temperature raw syngas cooled by the gas cooler is introduced into the gas treatment facility by means of a low-temperature gas delivery line LG. The gas treatment facility may be provided with any of various gas-treatment devices for removing from the gas, substances which may cause environmental pollution, such as dust, sulfur, chlorine, heavy metal particles and the like, whereby the coarse gas is cleaned up or refined to be a relatively high-quality syngas. A dust corrector for removing dust or foreign matters from the syngas, a desulfurization equipment for removing sulfur from the gas, a dechlorination device for removing chlorine from the gas, and a heavy-metal removing device for removing heavy metal particles from the gas are exemplified as the gas-treatment devices. The cleaned up syngas effluent from the gas treatment facility is fed to an energy utilizing facility through a cleaned up syngas delivery line FG. The energy utilizing facility may be any of various internal combustion engines or combustion facilities, such as a gas turbine device, gas engine device, boiler, industrial furnace, diesel engine and so forth. For instance, the line FG may be connected to an internal combustion engine in a gas turbine electric power plant, so that an electric power generator of the plant can generate electric power with combustion operation of the internal combustion engine, and the electric power is supplied to facilities or instruments (not shown) residing outside the system. The cleaned up syngas is supplied to the steam/air heating device at least partially by means of another syngas delivery line RG, so that the gas effects a combustion reaction in the heating device. The heating device thermally transfers the heat of combustion reaction to the low-temperature steam and air by means of its heat exchangers, so that the steam and air are heated up to the high-temperature range as set forth above.

The gasifying apparatus thus arranged functions to generate the thermal decomposed gas or pyrolysis gas with the thermal decomposition of the liquid or solid fuel, and reform the gas with use of the high-temperature steam and air so as to produce the high-temperature syngas. The sensible heat possessed by the high-temperature syngas is used for generating low-temperature steam in the gas cooler. The cleaned up syngas after the gas treatment is supplied to the steam/air heating device and the energy utilizing facility. Thus, in accordance with the aforementioned arrangement of the gasifying apparatus, an improved gasifying system is provided, which can generate electric power by means of the combustion reaction of the cleaned up syngas produced from the liquid or solid fuel, such as a waste gasification electric power generating system, a coal gasification electric power generating system and so forth.

Figure 2:
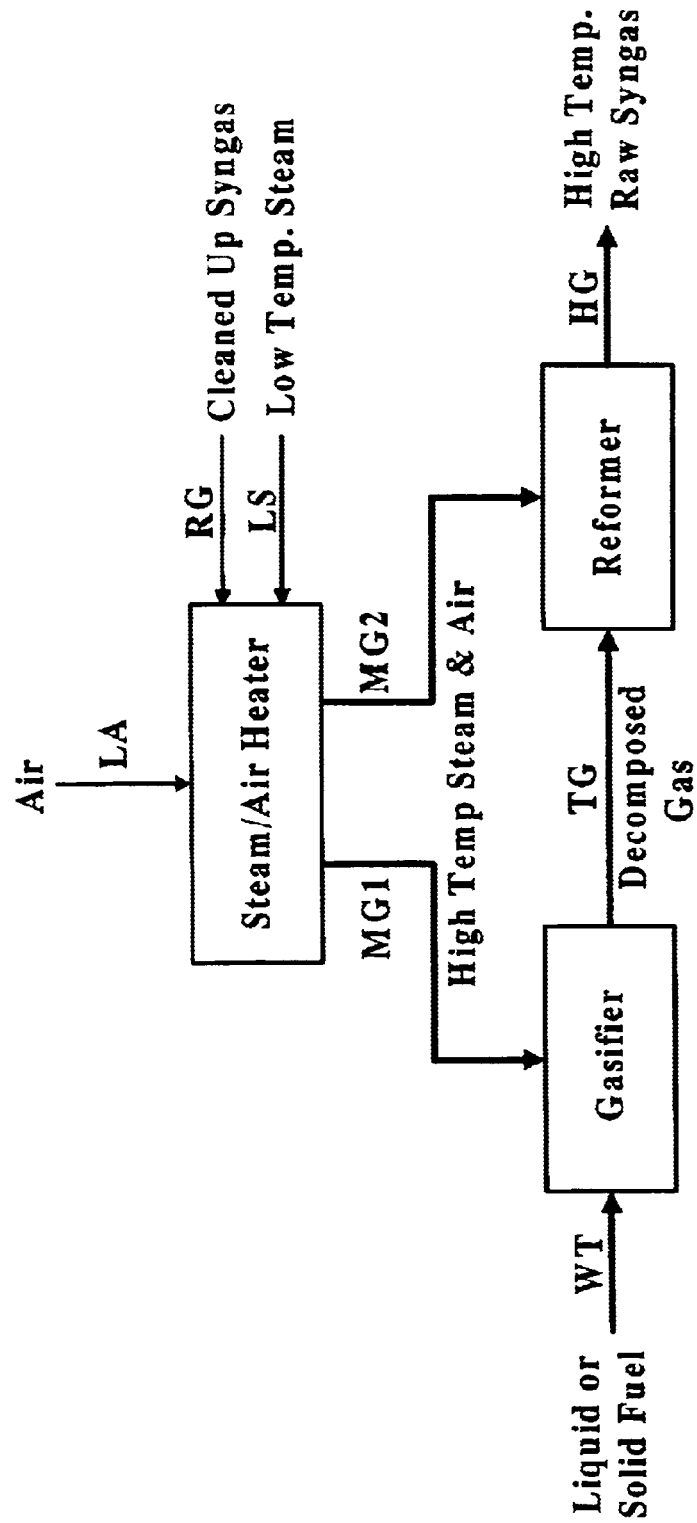
FIG. 2 is a block flow diagram of the gasifying facility as shown in FIG. 1.

FIG. 2 is a block diagram illustrating a process flow of the gasifying facility as shown in FIG. 1.

In the gasifying facility shown in FIG. 2, the low-temperature air supply line LA, low-temperature steam supply line LS and syngas delivery line RG are adapted to feed the low-temperature air, low-temperature steam and cleaned up syngas to the steam/air heating device. The cleaned up syngas is burned in the combustion area of the heating device. The heat of combustion reaction of the syngas is transferred to the low-temperature steam and air by means of heat exchangers of the heating device (not shown), so that the steam and air are heated up to a raised temperature equal to or higher than 700 deg. C., preferably higher than 800 deg. C. The heated steam and air are introduced into a thermal decomposition gasifier and a reformer of the gasifying facility through gas supply lines MG1, MG2, respectively. Preferably, the ratio by weight of the high-temperature air relative to the high-temperature steam is set to be in a range between 2:8 and 5:5.

The high-temperature air and steam introduced into the gasifier provide a combustion atmosphere of a low oxygen density within the gasifier, and supply the gasifier with an amount of sensible heat required for baking the liquid or solid fuel therein. A liquid or solid fuel, such as a mixture of various liquid, semi-solid and solid wastes, is charged into the gasifier by the fuel supply means WT. The mixture of wastes are baked under the high-temperature and low oxygen combustion atmosphere in the gasifier, whereby the wastes are thermally decomposed into the residue and the thermal decomposed gas primarily containing hydrocarbon. The decomposed gas is delivered from the gasifier to the reforming area of the reformer through a decomposed gas delivery line TG, whereas the residue is successively discharged from the gasifier during the combustion operation or discharged therefrom together with condensed water after a stopping and cooling down operation.

The thermal decomposed gas is introduced into the reforming area of the reformer to be mixed with the high-temperature air and steam. The exothermic reaction is carried out in the reforming area between the hydrocarbon of the decomposed gas and the high-temperature air, while the endothermic reforming reaction is simultaneously carried out therein between the hydrocarbon and the high-temperature steam. The heat required for the steam reforming reaction of hydrocarbon derives from the sensible heat of the high-temperature stream itself as well as the heat generated by the reaction of hydrocarbon and high-temperature air. The reformed gas effluent from the reforming area is introduced into a high-temperature gas delivery line HG as the aforementioned high-temperature raw syngas.

According to the illustrated embodiment of the present invention, the high-temperature steam fed to the thermal decomposition gasifier acts as a heating medium and an inert gas possessing a large amount of sensible heat, and the high-temperature steam fed to the reformer acts as a reforming agent and a heating medium to partially supply the heat required for the hydrocarbon steam reforming reaction of the thermal decomposed gas.

Figure 3:
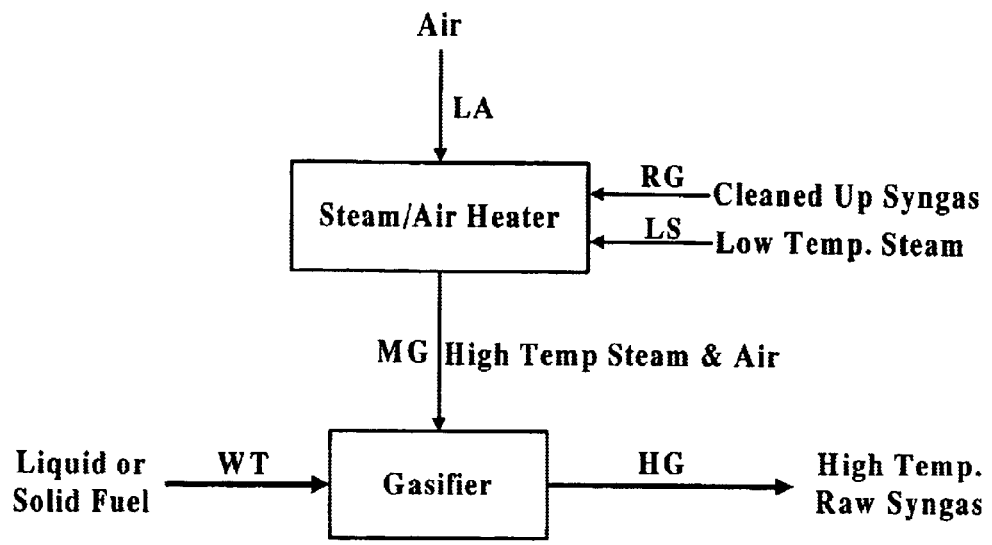
FIG. 3 is a block flow diagram illustrating a modification of the gasifying facility as shown in FIG. 2.
Figure 3:
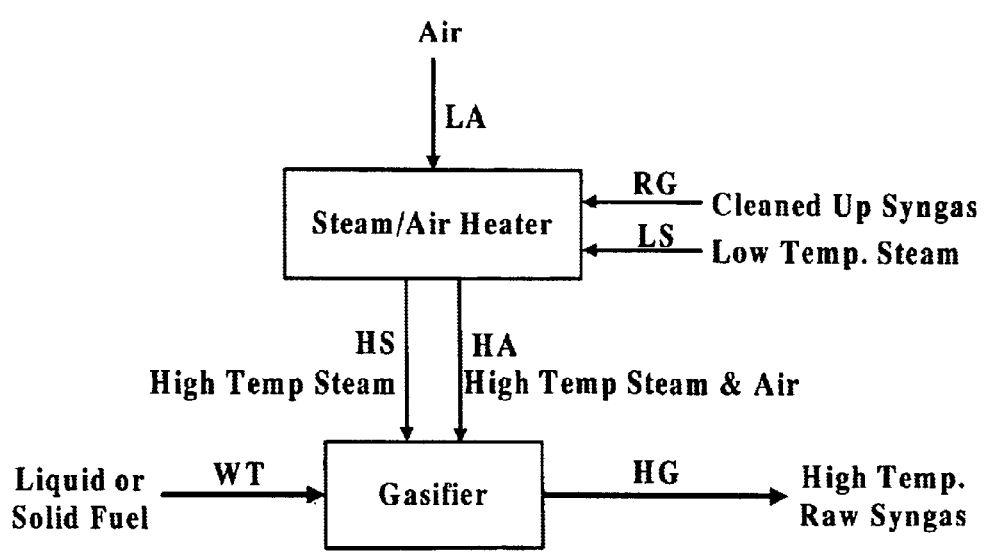

FIG. 3 is a block diagram illustrating a process flow in a modification with respect to the gasifying facility as shown in FIG. 1.

In the gasifying facility shown in FIG. 3, the steam/air heating device allows the low-temperature air and steam to be heated to a high-temperature equal to or higher than 700 deg. C., preferably higher than 800 deg. C., and more preferably higher than 1000 deg. C., by means of the heat of combustion of the cleaned up syngas. The heated air and steam are successively introduced into the gasifier. Preferably, the ratio by weight of high-temperature stream to high-temperature air is set to be in a range between 2:8 and 5:5. In the arrangement shown in FIG. 3A, a mixture of high-temperature air and steam is fed to the gasifier through a gas supply line MG. On the other hand, the high-temperature air and steam as in the arrangement shown in FIG. 3B are respectively introduced into the gasifier through respective gas supply lines HA and HS and mixed with each other in the gasifier.

The high-temperature air introduced into the gasifier acts on the liquid or solid fuel as a gasifying agent. As the liquid or solid fuel is brought into contact with the high-temperature air, the exothermic oxidation reaction therebetween causes the fuel to be melted and thermally decomposed to produce the thermal decomposed gas or pyrolysis gas. The molten slag, ash or residue is discharged from the gasifier during operation thereof or after its stopping and cooling manipulation. The high-temperature steam introduced into the gasifier prevents a large quantity of soot from being produced during melting and gasifying process of the liquid or solid fuel, while effecting a steam reforming reaction of the hydrocarbon in the thermal decomposed gas so as to reform the gas. The reformed gas effluent from the gasifer is delivered to the high-temperature gas delivery line HG as a high-temperature raw syngas.

According to such a gasifying facility, the high-temperature steam introduced into the gasifier acts to restrict production of soot which may be, otherwise, produced in relation to the melting and gasifying action of the liquid or solid fuel, and the steam also acts to be a heating medium and reforming agent possessing an amount of heat required for the hydrocarbon steam reforming reaction of the thermal decomposed gas. If desired, the delivery line HG may be additionally equipped with a reformer as shown in FIG. 1 in such a manner that the high-temperature air and steam are further introduced into the reforming area of the reformer.

Figure 4:
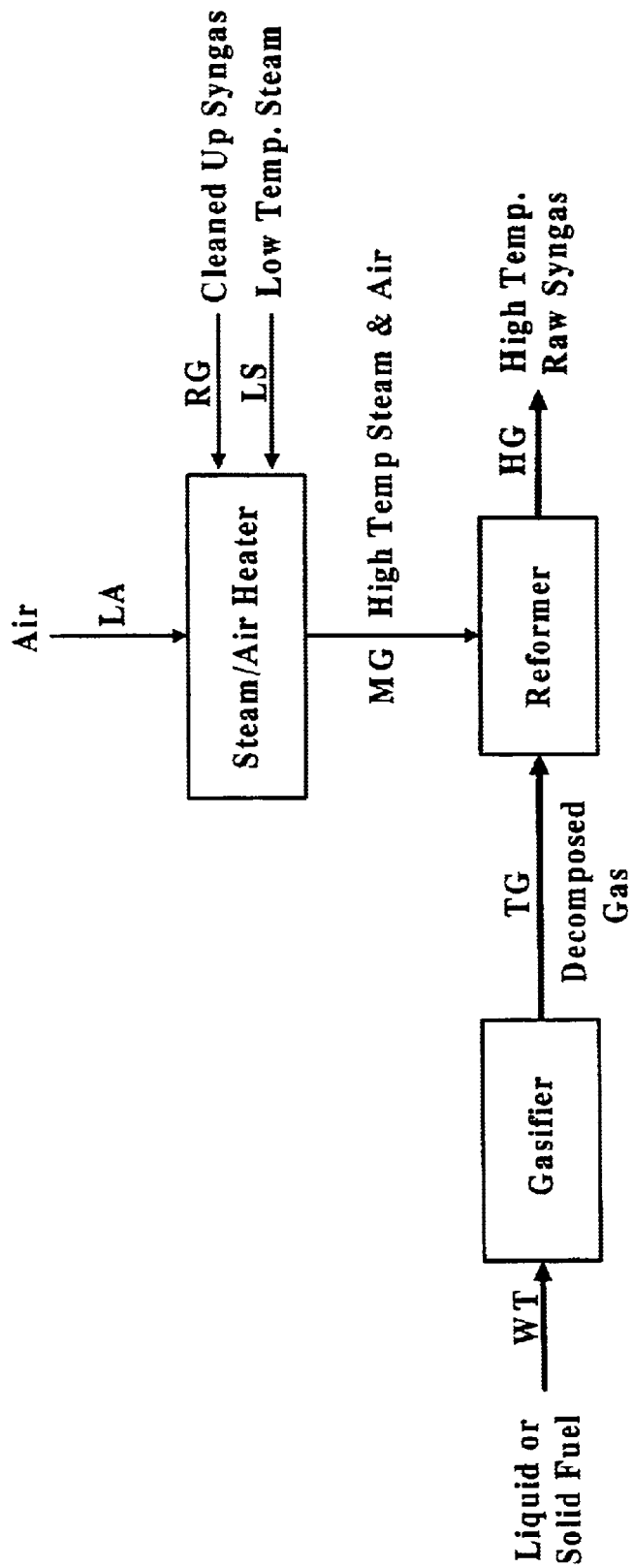
FIG. 4 is a block flow diagram illustrating a further modification of the gasifying facility as shown in FIG. 2.

FIG. 4 is a block diagram illustrating a process flow in a further modification with respect to the gasifying facility as shown in FIG. 1.

The gasifying facility as shown in FIG. 4 comprises an external heating type of thermal decomposition gasifier and a gas reformer having a reforming area. The steam/air heating device heats a quantity of low-temperature air and steam up to a raised temperature equal to or higher than 700 deg. C., preferably higher than 800 deg. C. with use of the heat of combustion of the syngas, and the air and steam thus heated are introduced into the gas reformer. The ratio by weight of high-temperature air relative to high-temperature steam is set to be in a range from 2:8 to 5:5.

The liquid or solid fuel charged into the thermal decomposition gasifier is thermally decomposed into a thermal decomposed gas and residue within an internal area of the gasifier. The thermal decomposed gas or pyrolysis gas is introduced into the reformer through the decomposed gas delivery line TG. In the reforming area of the reformer, the decomposed gas is mixed with the high-temperature steam and air so that the steam reforming reaction of hydrocarbon in the decomposed gas is carried out in the existence of the high-temperature steam. The heat required for performing the hydrocarbon steam reforming reaction is given by the sensible heat of the high-temperature steam as well as the heat of reaction between the high-temperature air and the hydrocarbon. The effluent of reformed gas is delivered to the high-temperature gas delivery line HG as the high-temperature raw syngas containing a relatively large quantity of carbon monoxide and hydrogen.

Figure 5:
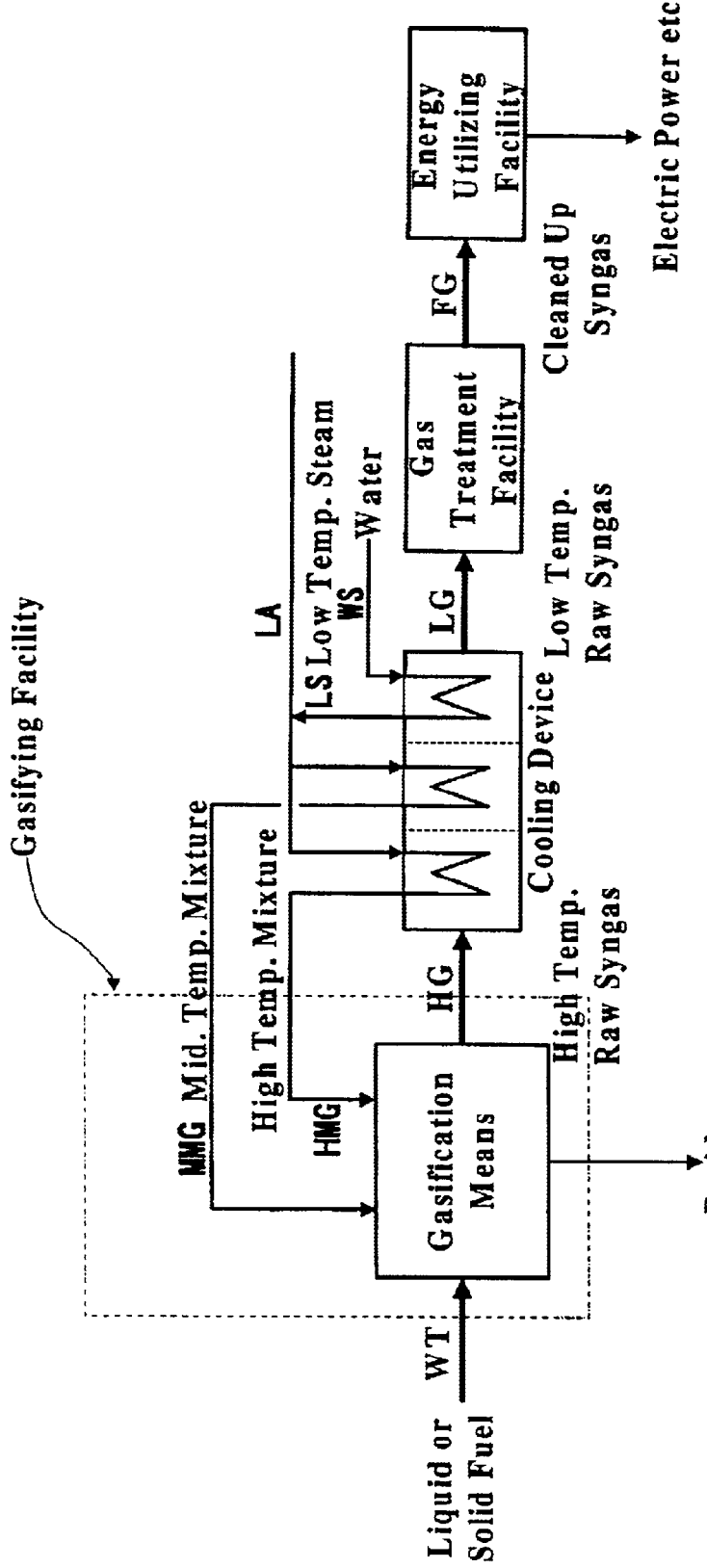
FIG. 5 is a system flow diagram generally illustrating an arrangement of another embodiment of the liquid or solid fuel gasifying apparatus according to the present invention.

FIG. 5 is a system flow diagram illustrating another preferred embodiment of a liquid or solid fuel gasifying apparatus constructed in accordance with the present invention.

In the illustrated embodiment as shown in FIG. 5, the gasifying apparatus is provided with a cooling device for cooling the high-temperature raw syngas and heating a quantity of low-temperature air and steam with use of the sensible heat of the high-temperature syn gas. The cooling device is interposed between the high-temperature gas delivery line HG and the low-temperature gas delivery line LG. The cooling device comprises a high-temperature section, a mid-temperature section and a low-temperature section which are aligned or arranged in sequence in the direction of syngas flow. Each of these sections is provided with one of three types of heat exchangers, i.e., a high-temperature heat exchanger, a mid-temperature heat exchanger and a heat exchanger for steam generation, which are adapted to be in heat-transferable contact with the syngas. If desired, dust collecting means, such as ceramic filters, are installed on the delivery line HG.

A water supply line WS is connected to an inlet port of the steam generation heat exchanger, so that a quantity of water supplied through the line WS is evaporated by the heat of syngas, and the steam effluent from the steam generation heat exchanger is delivered to the low-temperature steam supply line LS as being superheated steam at a relatively low temperature range, e.g., between 150 deg. C. and 250 deg. C. The low-temperature steam through the supply line LS is introduced into the low-temperature air supply line LA to be joined and mixed with a low-temperature air flow which is at an ambient temperature. A mixture of steam and air, i.e., low-temperature mixture is introduced into an inlet port of each of the high-temperature and mid-temperature heat exchangers, through which the mixture is heated by the heat of the syngas.

The high-temperature heat exchanger positioned on an upstream side of the syngas flow heats the low-temperature mixture up to a raised temperature equal to or higher than 700 deg. C., preferably higher than 800 deg. C. The mid-temperature heat exchanger located at the center part of the cooling device heats the low-temperature mixture up to a temperature range higher than 500 deg. C., preferably in a range between 600 deg. C. and 700 deg. C. (referred to as "mid-temperature" hereinafter). The high-temperature raw syngas, which is sequentially cooled through the respective sections by heat exchange action with the above mixture or water, is delivered from the delivery line LG to the gas treatment facility as a low-temperature syngas. The high-temperature mixture heated by the high-temperature heat exchanger is fed to the gasifying facility through a high-temperature mixture supply line HMG, and the mid-temperature mixture heated by the mid-temperature heat exchanger is fed to the gasifying facility through a mid-temperature mixture supply line MMG. Preferably, the ratio by weight of high-temperature air to high-temperature steam is set to be in a range between 2:8 and 5:5.

Figure 6:
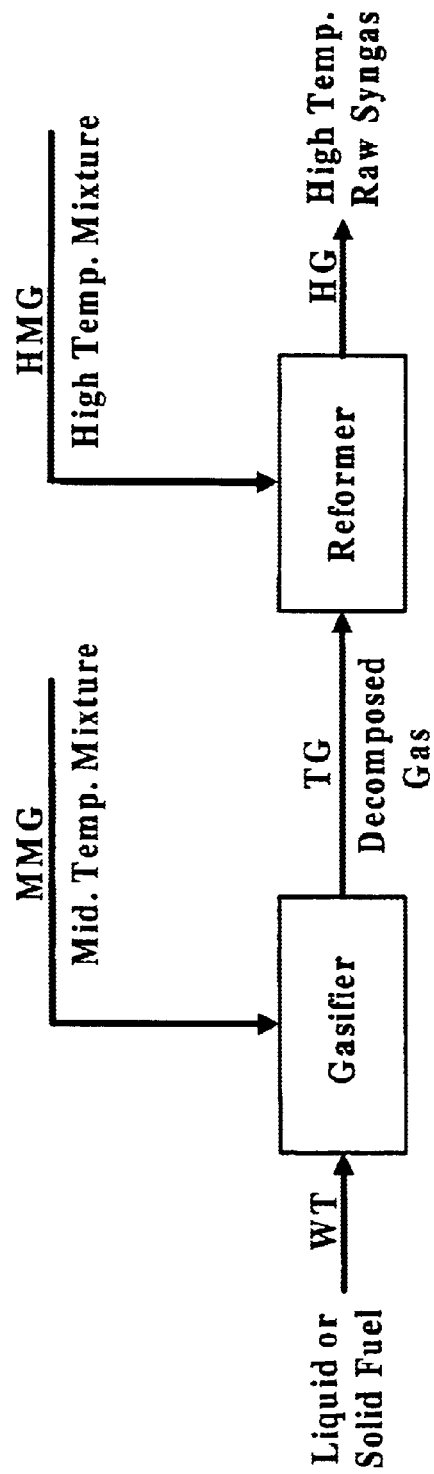
FIG. 6 is a block flow diagram illustrating the gasifying facility as shown in FIG. 5.

FIG. 6 is a block flow diagram illustrating a process flow in the gasifying facility as shown in FIG. 5.

The downstream end of the supply line MMG is connected to the thermal decomposition gasifier. The mid-temperature mixture introduced into the gasifier provides a low oxygen combustion atmosphere in the internal area of the gasifier, as well as it gives the atmosphere a quantity of sensible heat required for baking the waste (liquid or solid fuel). The wastes in the gasifier is thermally decomposed into thermal decomposed gas and residue. The thermal decomposed gas or pyrolysis gas is introduced into the reforming area of the reformer through the thermal decomposed gas delivery line TG, whereas the residue is discharged from the gasifier.

The downstream end of the supply line HMG is connected to the reformer so that the high-temperature mixture is introduced into the reforming area of the reformer. In the reforming area, the exothermic reaction occurs and progresses between the hydrocarbon of the thermal decomposed gas and the high-temperature air, as well as the endothermic reforming reaction simultaneously occurs and progresses between the hydrocarbon and the high-temperature steam. Similarly to the aforementioned embodiment, a quantity of heat required for the steam reforming reaction of the hydrocarbon is obtained by the heat of reaction between the hydrocarbon and the high-temperature air and the sensible heat of the high-temperature steam. The reformed gas produced in the reforming area is introduced into the delivery line HG as a high-temperature raw syngas and cooled down in the cooling device by the heat exchange action with the supplied water and the low-temperature mixture of air and steam, as set forth above.

According to such an arrangement, the gasification of wastes and the reforming reaction of the thermal decomposed gas can be carried out by the high-temperature steam and air which are generated or heated by the sensible heat of the reformed gas, and therefore, the thermal efficiency of the whole system is substantially improved. If desired, the cooling device may be separated into two parts, one incorporating both of the high-temperature and mid-temperature heat exchangers and the other incorporating the low-temperature heat exchanger. In such a case, a flow passage communicating the separate parts may be equipped with a desulfurizer or the like for removing acids and so forth contained in the raw syngas.

Preferred examples of the gasifying apparatus and method are described in detail hereinafter with reference to FIGS. 7 through 15.

Figure 7:
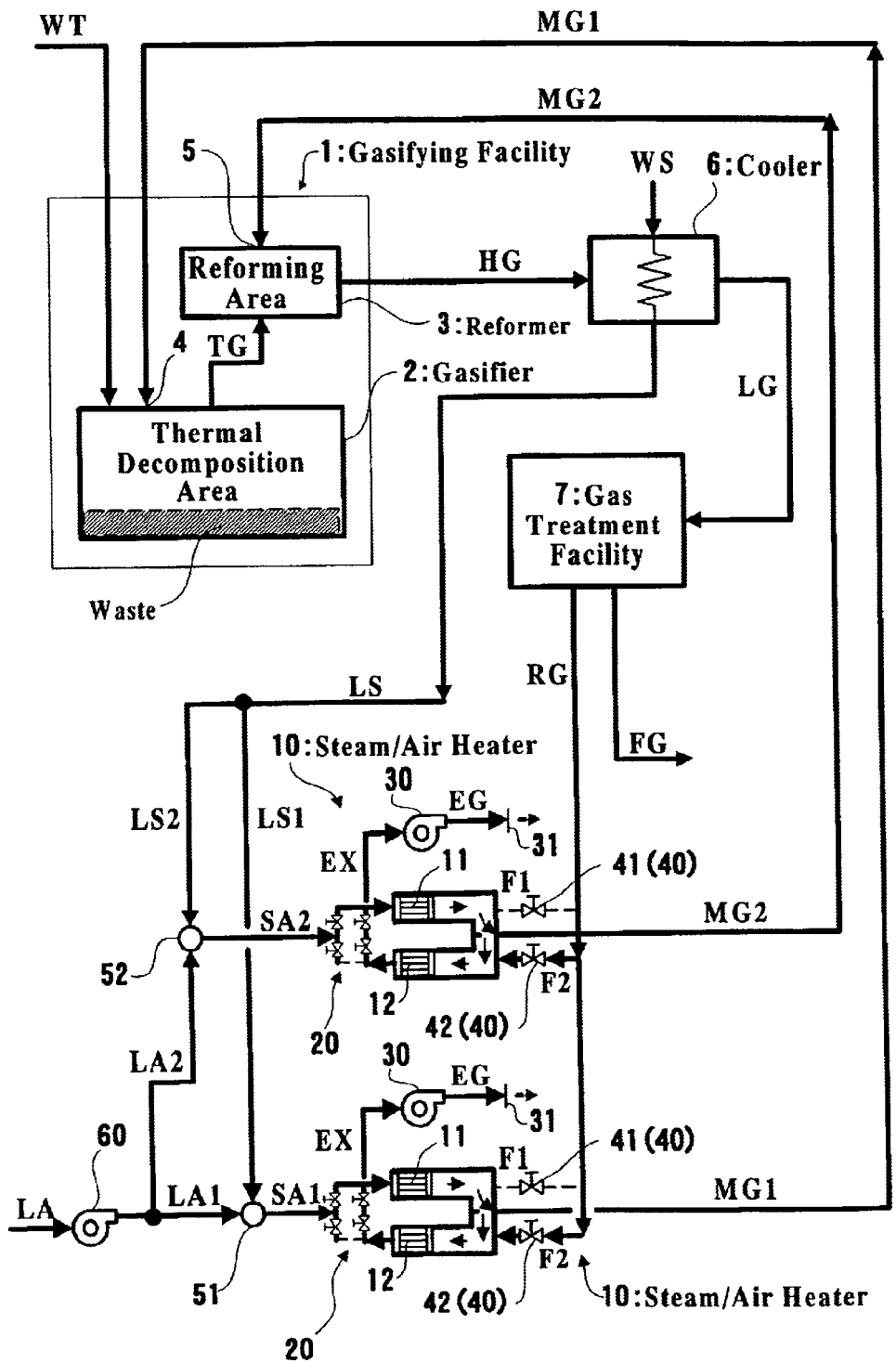
FIG. 7 is a system flow diagram illustrating a first example of the gasifying apparatus arranged in accordance with the present invention.

FIG. 7 is a diagram of system flow illustrating a first example of gasifying apparatus arranged in accordance with the present invention.

The waste gasifying system as shown in FIG. 7 is provided with a gasifying facility 1 which has an arrangement essentially based on the formation as shown in FIG. 2. The gasifying facility 1 is constituted by a thermal decomposition gasifier 2 and a reformer 3. The gasifier 2 is a batch loading type of thermal decomposition furnace provided with an internal area defining a thermal decomposition area, which is adapted to bake an amount of charged wastes. The reformer 3 located above the gasifier 2 is formed by a hollow structure defining a reforming area, which is in communication with the heat decomposition area of the gasifier 2 through a thermal decomposed gas delivery line TG.

The reforming area of the reformer 3 is connected to a gas cooler 6 through a high-temperature gas delivery line HG. The cooler 6 is connected to a gas treatment facility 7 through a low-temperature gas delivery line LG. Further, the gas treatment device 7 is connected to a gas turbine device or the like by means of a cleaned up syngas delivery line FG.

A water supply line WS is connected to a heat exchanger in the cooler 6, and the heat exchanger is connected to the upstream end of a low-temperature steam supply line LS, which is branched into first and second steam passages LS1, LS2. The downstream ends of the passages LS1, LS2 are connected to mixing control valves 51, 52, respectively. An air intake fan 60 is installed on a low-temperature air supply line LA to feed air at the ambient atmosphere thereinto, the line LA being branched into first and second air passages LA1, LA2. The downstream ends of the passages LA1, LA2 are connected to the mixing control valves 51, 52, respectively. Each of the valves 51, 52 is adapted to mix the low-temperature air and steam in a ratio (by weight) of air to steam ranging between 2:8 and 5:5.

The outlet ports of the valves 51, 52 are connected to the upstream end of low-temperature mixture supply line SA1, SA2, respectively. The downstream ends of the supply lines SA1, SA2 are connected to changeover means 20 of the steam/air heating devices 10, respectively. The heating devices 10 are connected to the upstream ends of high-temperature mixture supply lines MG1, MG2, respectively. The downstream ends of the supply lines MG1, MG2 are connected to the high-temperature mixture inlets 4, 5 of the gasifier 2 and reformer 3, respectively.

Figure 8:
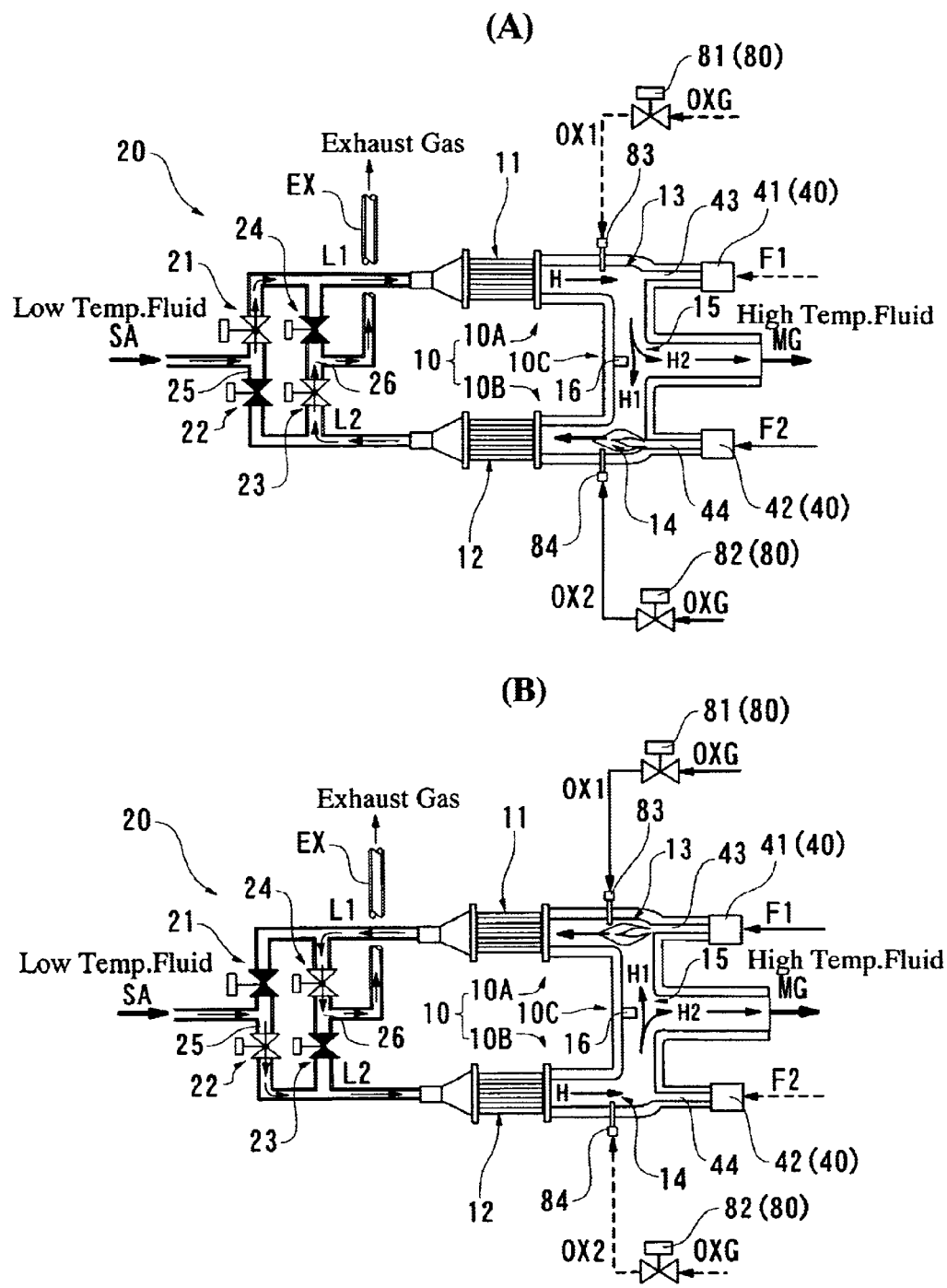
FIG. 8 is a schematic cross-sectional view showing the construction of the steam/air heating device and its manner of operation.

FIG. 8 is a schematic cross-sectional view generally showing the constructions of the heating device 10 and its manner of operation, FIG. 8A illustrating the first heating step of the heating device 10 and FIG. 8B illustrating the second heating step thereof.

As shown in FIG. 8, the steam/air heating device 10 comprises a pair of first and second heating sections 10A, 10B and a communication section 10C interconnecting the heating sections 10A, 10B. The first heating section 10A has a first heat exchanger 11 and a first combustion area 13 while the second heating section 10B has a second heat exchanger 12 and a second combustion area 14. The first and second combustion areas 13, 14 alternately communicate with the low-temperature mixture supply line SA through the heat exchangers 11, 12. The communication section 10C is symmetrically configured with respect to the center axis of the heating device 10, and a protrusion 16 is formed to project into the flow path in line with the center axis. The first and second heating sections 10A, 10B are provided with fuel supply ports 43, 44 and oxidant supply ports 83, 84. The fuel supply ports 43, 44 are connected to a fuel gas delivery line RG (FIG. 7) through fuel supply lines F1, F2, respectively. The supply ports 43, 44 are adapted to alternately deliver or inject the fuel gas into the combustion areas 13, 14. The oxidant supply ports 83, 84 are connected to an oxidant supply line OXG through its branch lines OX1, OX2, respectively. If desired, a quantity of oxidizing agent is alternately supplied to the combustion areas 13, 14 through the supply ports 83, 84.

Each of the heating devices 10 has a fuel supply control device 40 for controlling the fuel injection quantity and timing of the fuel supply port 43, 44, and an oxidant supply control device 80 for controlling the oxidant injection quantity and timing of the oxidant supply ports 83, 84. The control device 40 comprises first and second fuel supply control valves 41, 42 installed on the fuel supply lines F1, F2, and the control device 80 comprises first and second flow control valves 81, 82 installed on the oxidant supply lines OX1, OX2. In general, oxygen or air regulated in its oxygen concentration is used as the oxidant.

Each of the first and second heat exchangers 11, 12 comprises a regenerator made of ceramic or metallic honey-comb structures which have a number of cells or narrow channels. Each of the cells defines a channel having a cross-section of small dimensions, through which the mixture (steam and air) and combustion exhaust gas can alternately pass. Each of the regenerators is configured and sized to be incorporated in the respective heating sections 10A, 10B. The wall-thickness and pitch (wall span) of the cell walls are preferably set to be dimensions which correspond to the maximum volumetric efficiency of the regenerator and which ensure the temperature efficiency of the heat exchanger 11, 12 in a range between 0.7 and 1.0. More preferably, the wall-thickness of the cell wall is set to be a predetermined thickness equal to or smaller than 1.6 mm and the pitch of the cell walls is set to be a predetermined pitch equal to or smaller than 5.0 mm.

A splitting area 15 located between the first and second combustion areas 13, 14 is in communication with the upstream ends of the high-temperature mixture supply lines MG1, MG2, whereas the proximal ends of the first and second heat exchangers 11, 12 are in communication with the low-temperature mixture supply lines SA1, SA2 and an exhaust gas outlet passage EX through the changeover means 20. The changeover means 20 comprises first and second air intake valves 21, 22, and first and second exhaust valves 23, 24. The air intake valves 21, 22 are interconnected by the communication passage 25 of the supply lines SA1, SA2, while the exhaust valves 23, 24 are interconnected by the communication passage 26 of the exhaust gas outlet passage EX.

The first air intake and exhaust valves 21, 23 are synchronously operated to open and close simultaneously whereas the second air intake and exhaust valves 22, 24 are synchronously operated to open and close simultaneously. The heating device 10 is provided with a control device (not shown) which allows the first valves 21, 23 to open and the second valves 22, 24 to close during the first heating step as shown in FIG. 8(A). On the other hand, this control device allows the first valves 21, 23 to close and the second valves 22, 24 to open in the second heating step as shown in FIG. 8(B).

The structures and configurations of the honey-comb type regenerator and the steam/air heating device are described in detail, e.g., in Japanese Patent Application No. 5-6911 (Japanese Patent Laid-Open Application No. 6-213585) and Japanese Patent Application No. 10-189 (Japanese Patent Laid-Open Application No. 10-246428), and therefore, further detailed explanation is omitted from this description.

The operation of the waste gasification system having the aforementioned arrangement will be described below.

As shown in FIG. 7, an amount of wastes are charged into the thermal decomposition area of the gasifier 2 by the fuel supply means WT. The high-temperature mixture is fed through the high-temperature mixture supply line MG1 and introduced through the inlet port 4 into the gasifier 2, so that a high-temperature combustion atmosphere of a low oxygen concentration capable of baking the wastes is created in the thermal decomposition area. The wastes are thermally decomposed into the residue and the thermal decomposed gas. The residue of the burned waste is deposited on a bottom of the gasifier 2 and is discharged therefrom during operation of the gasifier 2 or after its stopping and cooling down operation.

The effluent of thermal decomposed gas flows into the reforming area of the reformer 3 through the decomposed gas delivery line TG and the high-temperature mixture is introduced from the high-temperature mixture supply line MG2 through the inlet port 5 into the reforming area. In the reforming area, the thermal decomposed gas is mixed with the high-temperature mixture, so that the high-temperature air and the hydrocarbon in the decomposed gas takes the exothermic reaction while the high-temperature steam and the hydrocarbon takes the endothermic reforming reaction. The reformed gas produced in the reforming area, i.e., the high-temperature raw syngas is introduced into the gas cooler 6 through the high-temperature gas delivery line HG.

The syngas cooled by the cooler 6 is introduced into the gas treatment device 7 through the low-temperature gas delivery line LG to undergo predetermined gas treatment processes, such as dust removal, desulfurization, decholorination, heavy metal removal and so forth. After the gas treatment processes, the low-temperature clean syngas is fed to the syngas delivery lines FG, RG, respectively. For instance, 60–80% by weight of the syngas is fed to the energy utilizing facility outside the system (not shown) through the delivery line FG, and 40–20% by weight of the syngas is fed to the heating device 10 through the delivery line RG to be used as the fuel for heating the mixture.

The water through the water supply line WS is heated by the heat exchanger in the cooler 6 and evaporated to be low-temperature steam, which is delivered through the supply line LS to the valves 51, 52. The low-temperature steam is mixed with the low-temperature air of the supply line LA by the valves 51, 52, and is fed through the supply lines SA1, SA2 to the changeover means 20 of the heating devices 10.

In the first heating step of the device 10, the changeover means 20 introduces the low-temperature mixture into the first combustion area 13 and discharges the combustion exhaust gas effluent from the second combustion area 14 into the exhaust gas line EX as shown in FIG. 8(A). In the second heating step, the changeover means 20 introduces the low-temperature mixture into the second combustion area 14 and discharges the effluent of combustion exhaust gas from the first combustion area 13 into the exhaust gas line EX as shown in FIG. 8(B).

In the first heating step as shown in FIG. 8(A), the fuel supply control device 40 allows the fuel supply port 44 to inject the syngas of the delivery line RG into the second combustion area 14. If desired, the oxidant supply control device 80 allows the oxidant supply port 84 to feed the oxidant to the area 14. The low-temperature mixture is heated up to a high temperature equal to or higher than 700 deg. C., preferably higher than 800 deg. C., while passing through the first heat exchanger 11. A high-temperature fluid stream H enters into the splitting area 15 to be split into first and second fluid streams H1, H2. The second stream H2 is conducted to the supply line MG, whereas the first stream H1 is conducted to the area 14 to be mixed with the syngas in order to cause a combustion reaction, thereby producing a high-temperature combustion exhaust gas in the area 14. The combustion exhaust gas is induced by an exhaust fan 30 (FIG. 7) through the second heat exchanger 12, second line L2 and the first exhaust valve 23 and released to the ambient atmosphere through an exhaust line EG and exhaust port 31. The combustion exhaust gas is in heat-transferable contact with the regenerator of the second heat exchanger 12 when passing therethrough, so that the sensible heat of the combustion exhaust gas is transferred to and accumulated in the regenerator.

In the second heating step as shown in FIG. 8(B), the low-temperature mixture is heated to the aforementioned high-temperature range while passing through the second heat exchanger 12. The heated gas stream H conducted into the splitting area 15 is split into the first and second streams H1, H2. The second stream H2 is conducted to the supply line MG, and the first stream H1 is conducted into the first combustion area 13 which is fed with the syngas and if desired, oxidant under control of the control devices 40, 80. The first stream H1 is mixed with the syngas to take a combustion reaction, thereby producing a high-temperature combustion exhaust gas in the area 13. The combustion exhaust gas is drawn by the exhaust fan 30 (FIG. 7) through the first heat exchanger 11, first line L1 and second exhaust valve 24, and discharged through the exhaust line EG and exhaust port 31. The combustion exhaust gas is in heat-transfer contact with the regenerator of the first heat exchanger 11 when passing therethrough, so that the sensible heat of the combustion exhaust gas is transferred to and accumulated in the regenerator.

The heating device 10 is alternately switched to the first or second heating steps at a predetermined time interval equal to or less than 120 seconds, preferably less than 60 seconds, and more preferably less than 30 seconds. Thus, the second stream H2 is continuously fed to the supply lines MG1, MG2 through which it is respectively supplied to the gasifier 2 and reformer 3 to maintain the high-temperature combustion atmosphere in the heat decomposition area and the steam reforming reaction in the reforming area.

Figure 9:
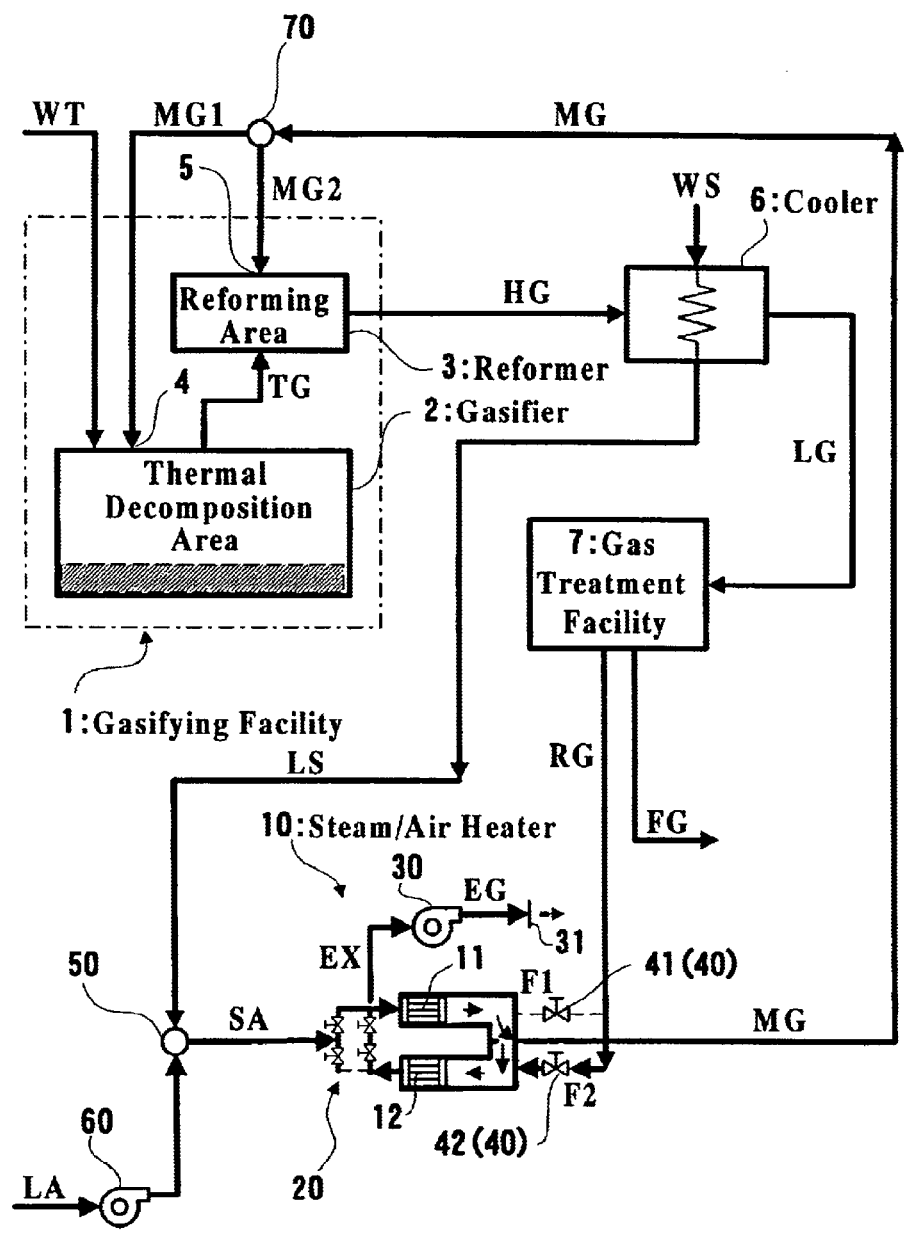
FIGS. 9 and 10 are system flow diagrams showing modifications of the gasifying apparatus as shown in FIG. 7.

FIG. 9 is a system flow diagram illustrating a modification with respect to the gasifying apparatus as shown in FIG. 7.

The waste gasifying system shown in FIG. 9 comprises a single steam/air heating device 10 and a mixing control valve 50, and a distribution control valve 70 is provided at the downstream end of the high-temperature mixture supply line MG. The distribution control valve 70 has a first delivery port in communication with the inlet port 4 through the first mixture supply line MG1 and a second delivery port in communication with the inlet outlet port 5 through the second mixture supply line MG2. The valve 70 is used for distributing the high-temperature mixture of the heating device 10, so that a predetermined ratio of the high-temperature mixture to the thermal decomposition area in the gasifier 2 and the remaining part thereof to the reforming area of the reformer 3. The other arrangements and constituents of the gasifying system are substantially the same as those of the system shown in FIG. 7.

Figure 10:
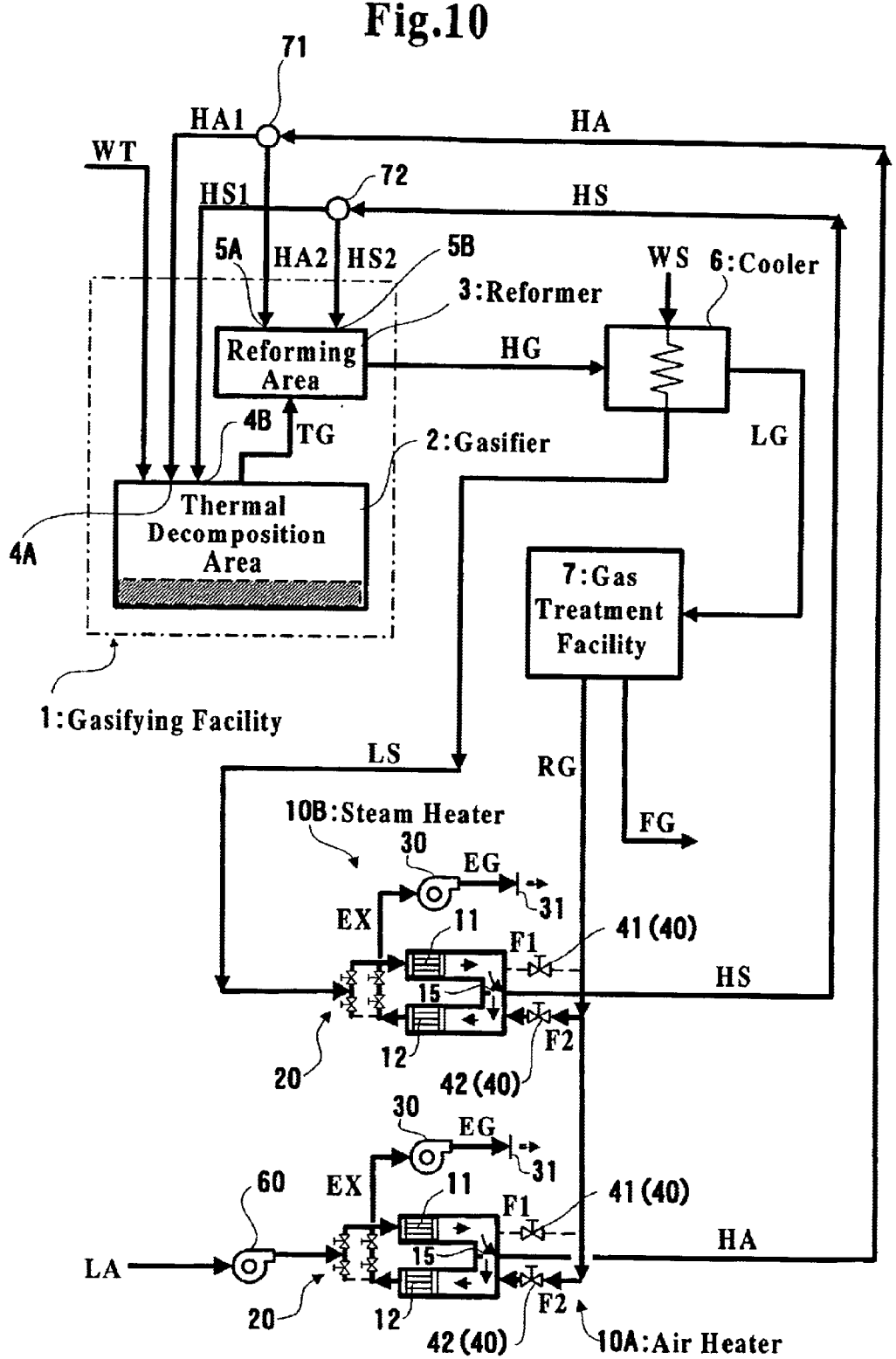

FIG. 10 is a system flow diagram of a further modification with respect to the gasifying apparatus as shown in FIG. 7.

The waste gasifying system shown in FIG. 10 is provided with an air heating device 10A for heating the low-temperature air and a steam heating device 10B for heating the low-temperature steam. The air heating device 10A has the changeover means 20 connected to the low-temperature air supply line LA and the splitting area 15 connected to the high-temperature air supply line HA. The intake fan 60 is installed on the supply line LA, and the distribution control valve 71 is connected to the downstream end of the supply line HA. On the other hand, the steam heating device 10B has the changeover means 20 connected to the low-temperature steam supply line LS and the splitting area 15 connected to the high-temperature steam supply line HS. A distribution control valve 72 is connected to the downstream end of the supply line HS.

The distribution control valve 71 is provided with first and second delivery ports connected to first and second high-temperature air lines HA1, HA2, respectively. The valve 72 is provided with first and second delivery ports connected to first and second high-temperature steam lines HS1, HS2, respectively. The first lines HA1, HS1 are in communication with the thermal decomposition area of the gasifier 2, so that the valves 71, 72 introduce a predetermined ratios of the high-temperature air and steam into the heat decomposition area through the inlet ports 4A, 4B, respectively. The second lines HA2, HS2 are in communication with the reforming area in the reformer 3, so that the valves 71, 72 introduce the remaining ratios of the high-temperature air and steam into the reforming area through the inlet ports 5A, 5B, respectively. The high-temperature air and steam introduced into the heat decomposition area or the reforming area are mixed together therein. The other arrangements and constituents of the waste gasifying system are substantially the same as those of the system shown in FIG. 7.

Figure 11:
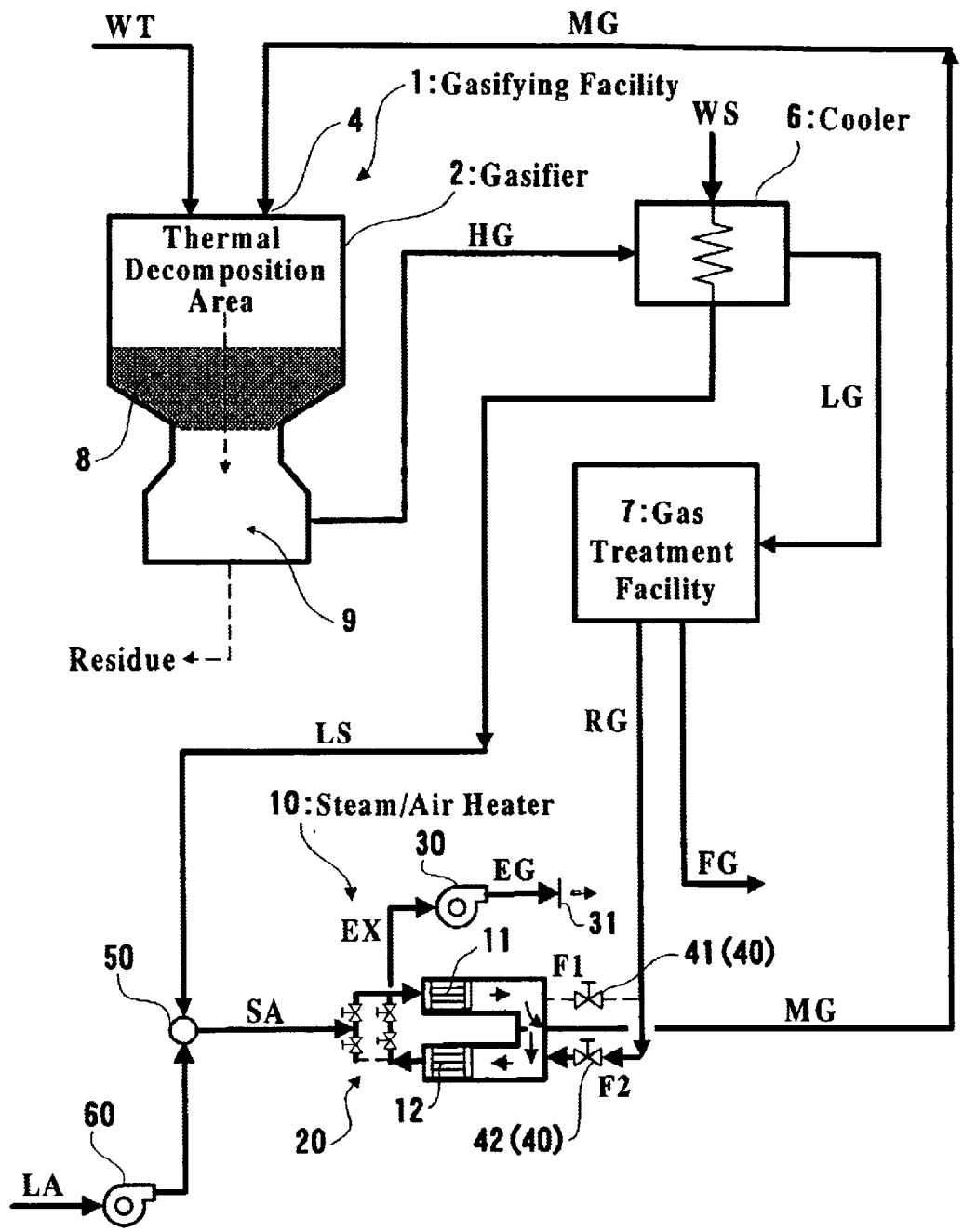
FIG. 11 is a system flow diagram illustrating the second example of the gasifying apparatus according to the present invention.

FIG. 11 is a system flow diagram generally illustrating the second example of the gasifying apparatus according to the present invention, wherein components and elements substantially the same as those of the aforementioned first example are indicated by the same reference numerals.

The waste gasifying system shown in FIG. 11 comprises a waste gasifying facility 1 having the constructions corresponding to the arrangement as shown in FIG. 3. The waste gasifying facility 1 comprises a pebble bed type gasifying furnace (gasifier) 2 which includes a pebble bed 8 formed by a number of spherical ceramic balls (pebbles). For instance, the pebble bed 8 is formed by layers charged with a number of alumina balls or stacked alumina balls, each of the balls having a diameter ranging between 20 mm and 50 mm. A thermal decomposition area capable of thermally decomposing the waste is located above the pebble bed 8. The gasifying facility 1 is provided with fuel supply means WT for charging the waste into the thermal decomposition area, and the waste appropriately prepared or crashed are charged into the gasifier 2 by the supply means WT. High-temperature mixture (air and steam) having its temperature equal to or higher than 1000 deg. C. is introduced into the heat decomposition area so that the mixture thermally decomposes and melts the waste. The spherical ceramic balls are heated by the high-temperature mixture so as to accumulate the sensible heat of the high-temperature mixture. The spherical ceramic balls in contact with the waste transfer the heat to the waste and promote or urge the thermal decomposition of the waste. The molten slag of the waste flows down through gaps between the spherical ceramic balls and into a slag/gas separation zone 9. The molten slag deposited on the bottom of the separation zone 9 is discharged therefrom, and chilled and solidified to be utilized as recycle materials such as building construction or civil engineering materials.

The thermal decomposed gas or pyrolysis gas produced in the waste melting process passes through the gaps between the ceramic balls of the pebble bed 8 and is effluent from the separation zone 9 to the high-temperature gas delivery line HG as a high-temperature syngas. The high-temperature raw syngas of the supply line HG flows through the cooler 6, low-temperature gas delivery line LG and gas treatment device 7, and is delivered to the supply lines FG, RG as the low-temperature clean sysngas. The syngas of the line FG is supplied to the energy utilizing facility such as a gas turbine device (not shown), and the syngas of the line RG is fed to the steam/air heating device 10. The cooler 6 is provided with a heat exchanger in which a quantity of water through the water supply line WS is evaporated into the low-temperature steam by the sensible heat of the high-temperature syngas, and the low-temperature steam of the low temperature steam supply line LS is mixed with the low-temperature air of the low-temperature air supply line LA by the mixing control valve 50 so that the mixture is fed through the changeover means 20 to the heating device 10. The valve 50 functions to mix the low-temperature steam and air in a predetermined ratio (by weight) ranging between 2:8 and 5:5.

The configuration and construction of the heating device 10 is substantially the same as that of the heating device as in the first example, and therefore, the first and second heating steps (FIGS. 8A and 8B) are alternately and repeatedly carried out at a predetermined time interval, for instance, equal to or shorter than 60 seconds, so that the low-temperature mixture of the low-temperature mixture supply line SA is continuously heated up to a raised temperature equal to or higher than 1000 deg. C. The heated mixture is fed through the high-temperature mixture supply line MG to the gasifier 2, and the high-temperature mixture causes the waste to be melted and gasified in the thermal decomposition area so as to be thermally decomposed into the molten slag and thermal decomposed gas. The high-temperature steam in the mixture acts to restrict production of soot during the melting and gasifying process of the waste while carrying out the steam reforming reaction of the hydrocarbon in the decomposed gas to reform the gas.

Figure 12:
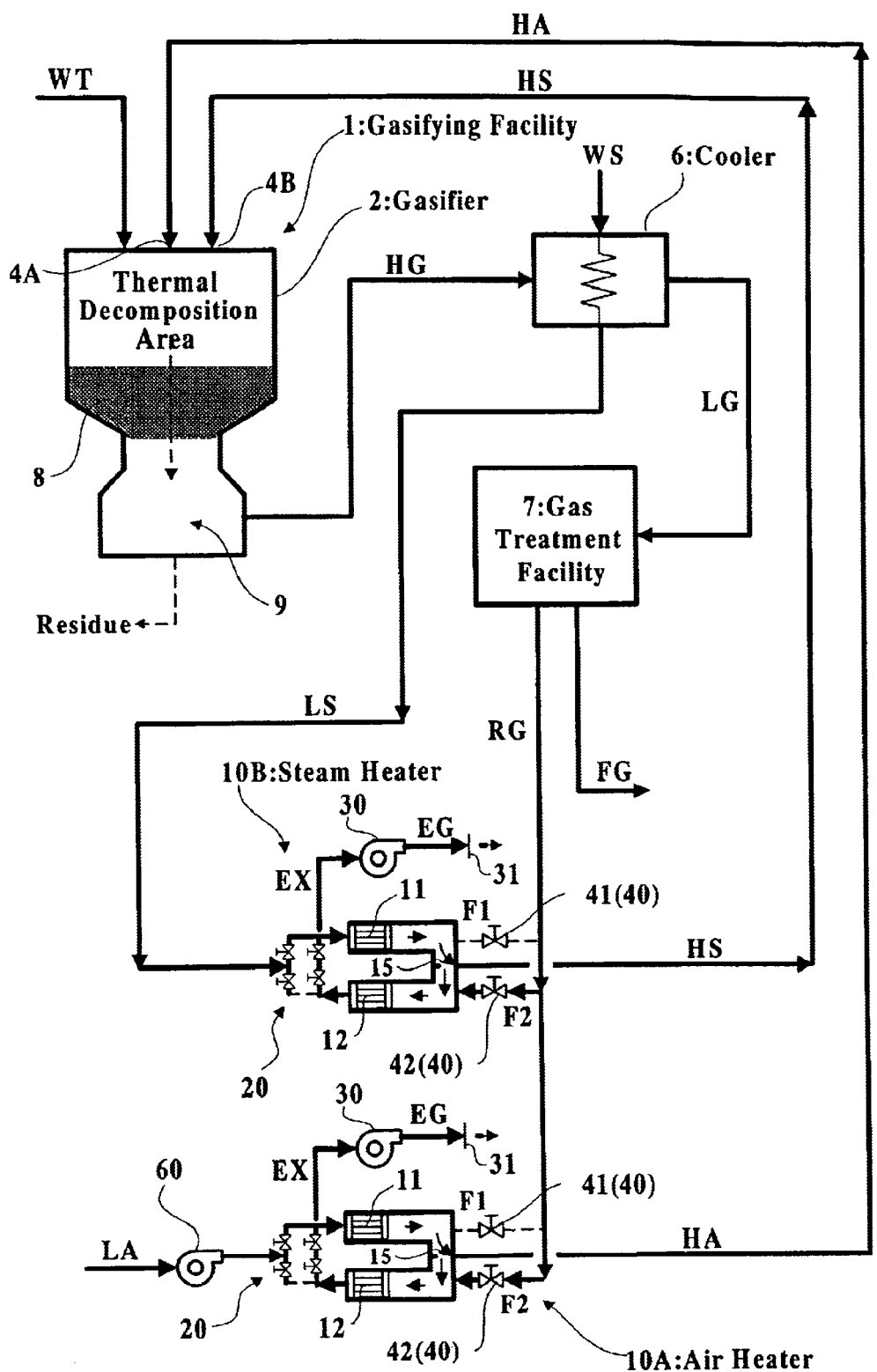
FIGS. 12 and 13 are system flow diagrams showing modifications of the gasifying apparatus as shown in FIG. 11.

FIG. 12 is a system flow diagram illustrating a modification with respect to the gasifying apparatus as shown in FIG. 11.

The waste gasifying apparatus shown in FIG. 12 comprises the air heating device 10A for heating the low-temperature air and the steam heating device 10B for heating the low-temperature steam, as in the example shown in FIG. 10. The air heating device 10A has the changeover means 20 connected to the low-temperature air supply line LA, which is provided with the air intake fan 60, and the splitting area 15 connected to the high-temperature air supply line HA. The steam heating device 10B has the changeover means 20 connected to the low-temperature steam supply line LS and the splitting area 15 connected to the high-temperature steam supply line HS.

The air and steam of the supply lines HA, HS are introduced into the thermal decomposition gasifier 2 through the inlet ports 4A, 4B, respectively. As set forth above, the high-temperature air and steam function to melt and gasify the waste in the heat decomposition area so that the waste is thermally decomposed into molten slag and decomposed gas, and the high-temperature steam acts to restrict production of soot as well as it carries out the steam reforming reaction of the hydrocarbon in the decomposed gas. The other arrangements and components of the gasifying system are substantially the same as those of the system shown in FIG. 11.

Figure 13:
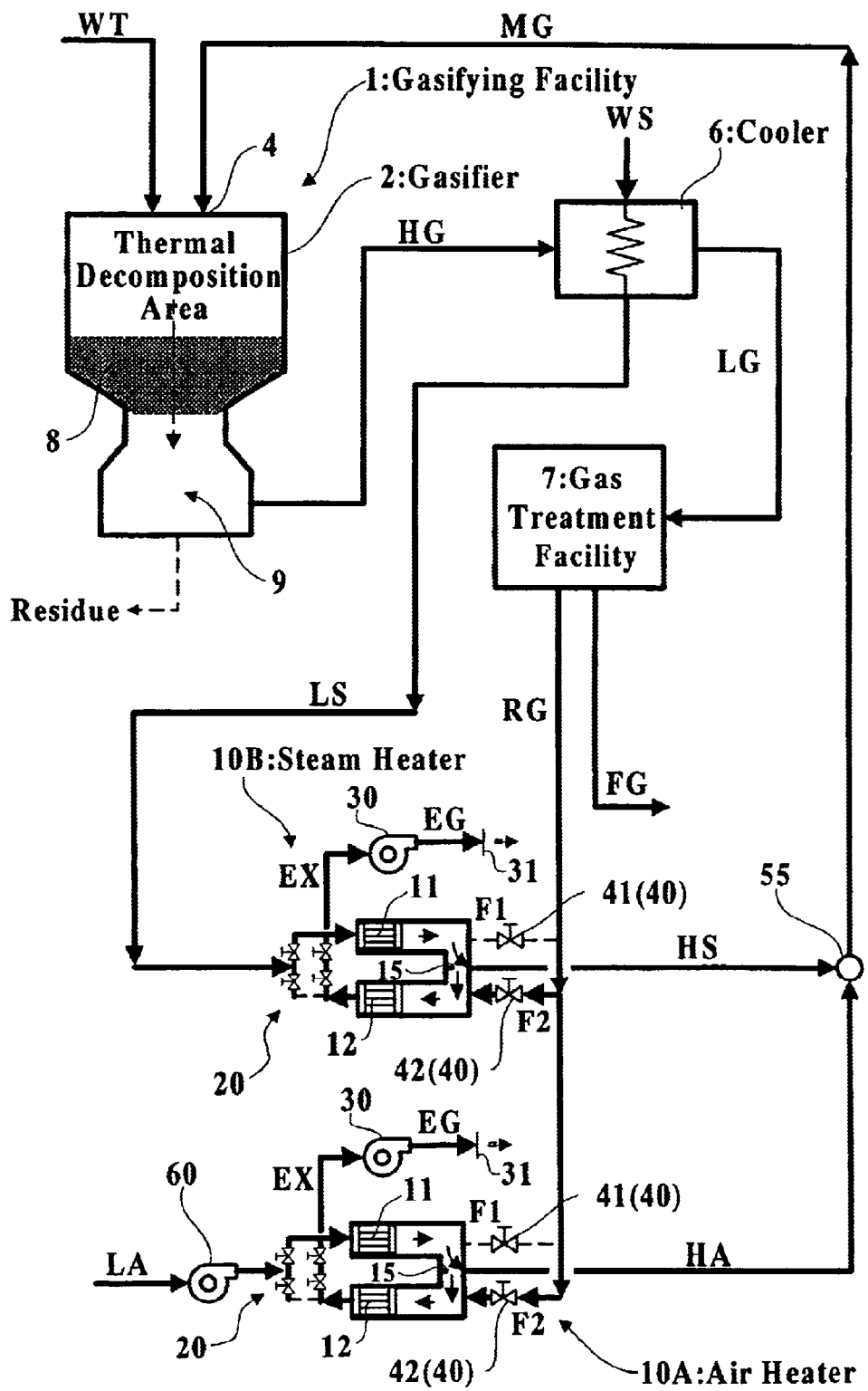

FIG. 13 is a system flow diagram showing a further modification with respect to the gasifying apparatus as shown in FIG. 11.

The waste gasifying system shown in FIG. 13 differs from the system shown in FIG. 12, in that a mixing control valve 55 is provided on the side of the high-temperature fluid passage. The high-temperature air and steam supply lines HA, HS are connected to the valve 55 which mixes the high-temperature air and steam in a predetermined mixing ratio. The high-temperature mixture of air and steam is supplied to the gasifying facility 1 through the high-temperature mixture supply line MG and introduced into the heat decomposition area through the inlet port 4. The other arrangements and components of this system are substantially the same as those of the system shown in FIGS. 11 and 12 and therefore, a further explanation is omitted herein.

Figure 14:
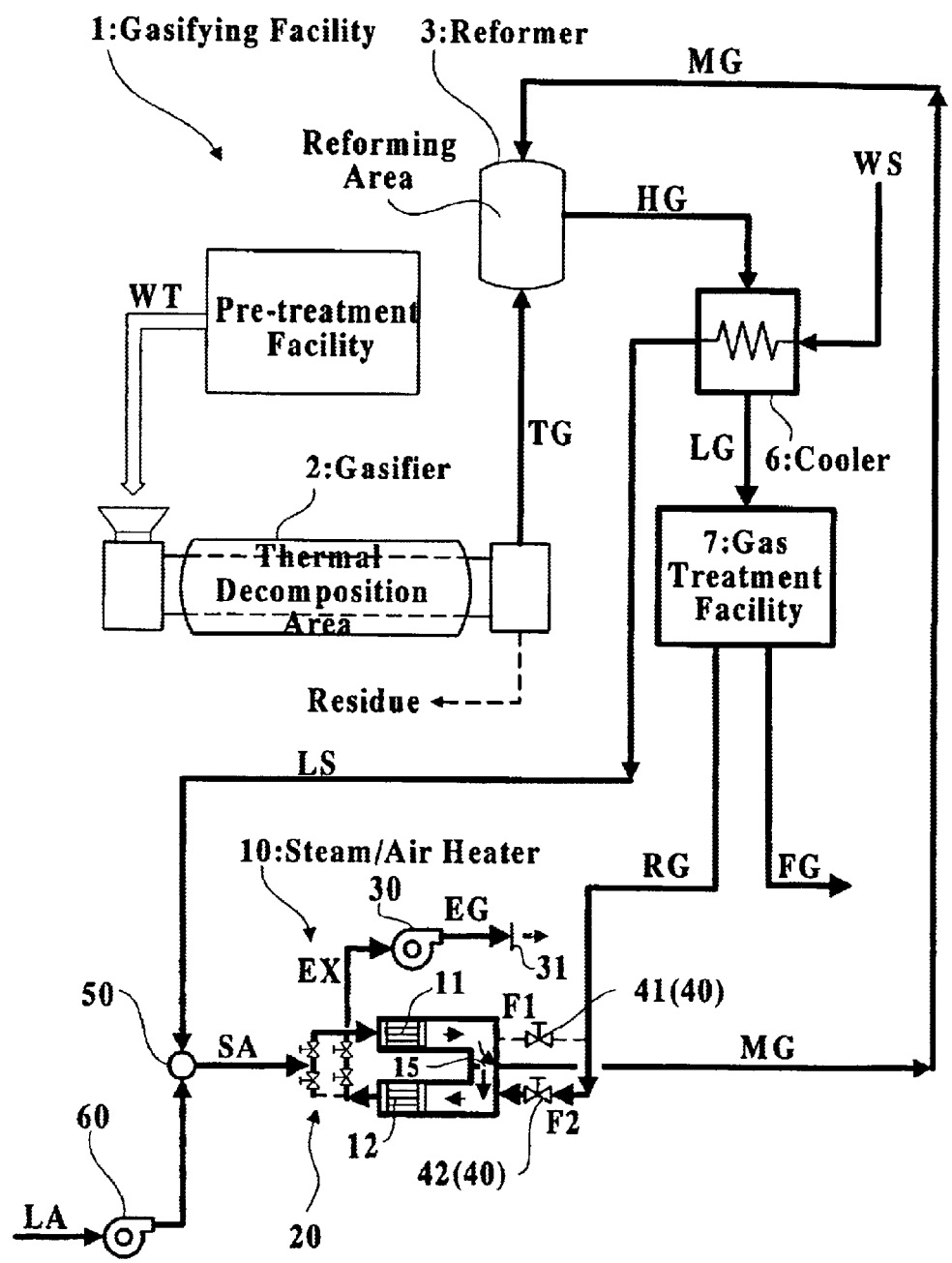
FIGS. 14 and 15 are system flow diagrams illustrating the third and forth examples of the gasifying apparatus according to the present invention.

FIG. 14 is a system flow diagram which generally shows the third example of the gasifying apparatus according to the present invention. The arrangements and components in FIG. 14, which are substantially the same as or equivalent to those of the first and second example, are designated by the same reference numerals.

The waste gasifying system shown in FIG. 14 comprises a gasifying facility 1, a cooler 6, a gas treatment facility 7 and a steam/air heating device 10. The gasifying facility 1, which is defined by a gasifier 2 and a reformer 3, is arranged to correspond to that shown in FIG. 4. The gasifier 2 is an external heating type of rotary kiln, which has a thermal decomposition area maintained and controlled to be a low or less oxygen combustion atmosphere under control of oxygen concentration control means (not shown). The pre-treatment device of the gasifier 2 includes known devices for performing crashing or shredding steps, classifying and drying steps, or sludge settling, dewatering and drying steps. For instance, the waste is crashed into fragments, each having a size equal to or smaller than 150 mm so as to improve the efficiency of thermal decomposition. The waste fragments are charged into the waste charging section of the gasifier 2, and heated up to a temperature ranging between approximately 500 deg. C. and 600 deg. C. in the combustion atmosphere of the thermal decomposition area. The waste is retained in a so-called baking state to be baked therein, and is decomposed into decomposed gas and residue in progress of the thermal decomposition reaction. The thermal decomposed gas and residue are separated from each other at a separation section. The separated residue is introduced into a residue discharging device, a valuable metal classifying device, a melting furnace or the like (not shown), whereas the decomposed gas effluent is introduced into the reforming area of the reformer 3.

The reforming area of the reformer 3 is connected to the gas cooler 6 through the high-temperature gas delivery line HG, and the cooler 6 is connected to the gas treatment facility 7 by means of the low-temperature gas delivery line LG. The gas treatment device 6 is connected to any suitable energy utilizing facility, such as a gas turbine device (not shown), through the fuel gas delivery line FG.

The water supply line WS is connected to a heat exchanger in the cooler 6, which is connected to the upstream end of the low-temperature steam supply line LS. The downstream end of the supply line LS is connected with a first inlet port of the mixing control valve 50. The low-temperature air supply line LA, which has the air intake fan 60 for supplying ambient air, is connected with the second port of the control valve 50. The outlet port of the control valve 50 is connected with the low-temperature mixture supply line SA. The control valve 50 functions to mix low-temperature air and steam together in a predetermined mixing ratio (by weight) ranging between 2:8 and 5:5 in order to supply the mixture of low-temperature air and steam to the steam/air heating device 10.

The heating device 10 has substantially the same constructions as those of the previously mentioned examples and is adapted, in a similar manner, to be alternately switched to the first and second heating steps (FIGS. 8A and 8B) at a predetermined time interval, e.g., equal to or shorter than 60 seconds. Therefore, the low-temperature mixture through the supply line SA is continuously heated up to a temperature equal to or higher than 700 deg. C., preferably higher than 800 deg. C., and the heated mixture is delivered to the high-temperature mixture supply line MG. The supply line MG is introduced into the reformer 3 to be mixed with the decomposed gas in the reforming area, so that the exothermic reaction occurs between the high-temperature air and the hydrocarbon of the decomposed gas in the reforming area, as well as the endothermic reforming reaction occurs therein between the hydrocarbon and the high-temperature steam. The reformed gas effluent from the reforming area is introduced into the cooler 6 through the delivery line HG as a high-temperature raw syngas. The other arrangements and components of this system are substantially the same as those of the previously mentioned examples and therefore, a further explanation is omitted herein.

Figure 15:
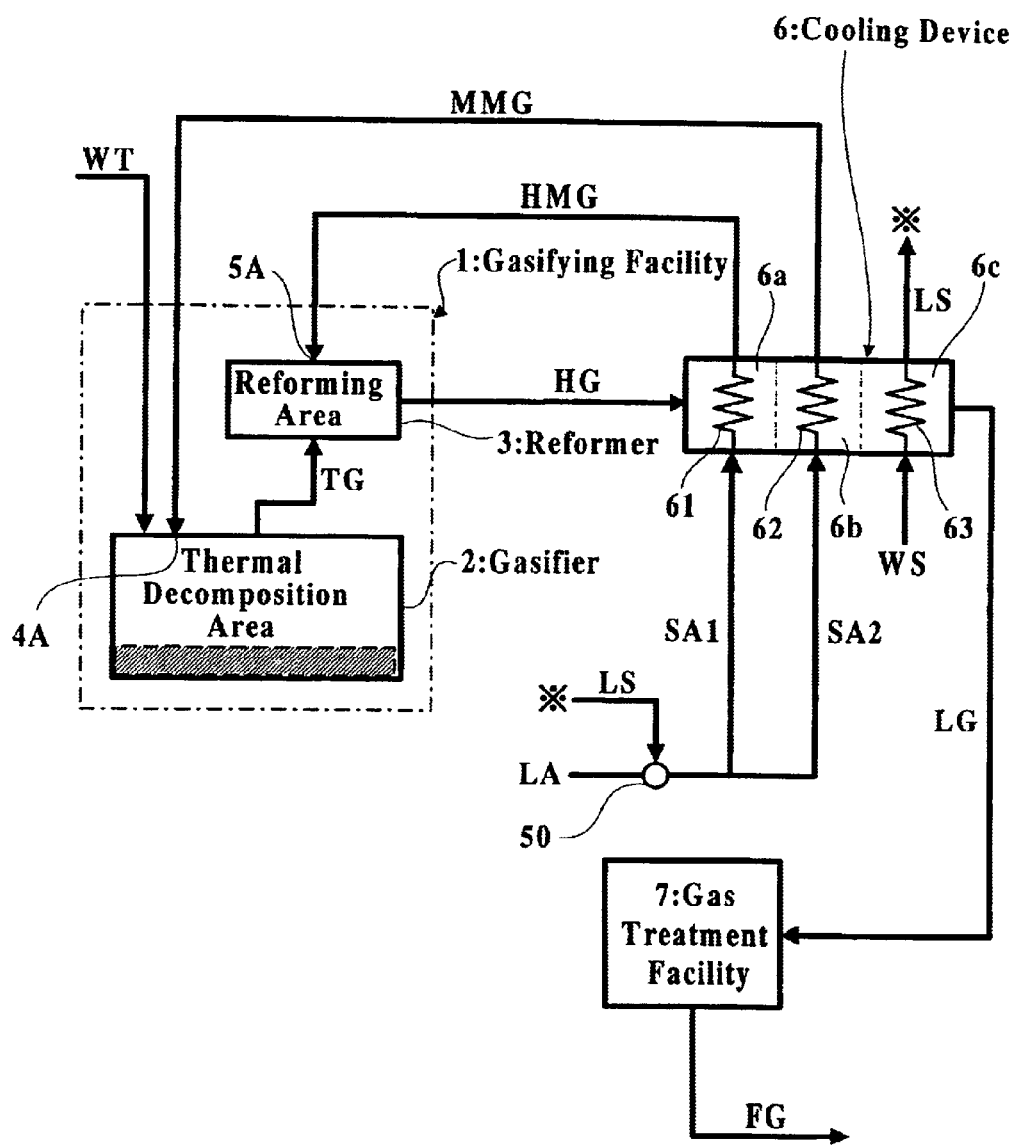

FIG. 15 is a system flow diagram generally showing the arrangement of the gasifying apparatus which is the fourth example of the gasifying apparatus according to the present invention, wherein constituents or components substantially the same as those of the previously mentioned examples are designated by the same reference numerals.

The waste gasifying system shown in FIG. 15 includes a gasifying facility 1 having the arrangement corresponding to that shown in FIGS. 5 and 6, which comprises a thermal decomposition gasifier 2 and a reformer 3. The gasifier 2 is a batch loading type of thermal decomposing furnace having a thermal decomposition area communicating with a reforming area of the reformer 3 through the thermal decomposed gas delivery line TG. The reforming area of the reformer 3 is connected to a high-temperature heat exchanger 61 of the cooling device 6 through a high-temperature mixture supply line HMG. Further, the thermal decomposition area in the gasifier 2 is connected to a mid-temperature heat exchanger 62 through a mid-temperature mixture supply line MMG.

The cooling device 6 is provided with high-temperature, mid-temperature and low-temperature sections 6a, 6b, 6c in series which are arranged in an order from the upstream side to the downstream side of the raw syngas flow. The high-temperature section 6a communicates with the reformer 3 through the high-temperature gas delivery line HG. If desired, the delivery line HG is provided with dust collectors, such as ceramic filters. Each of the high-temperature and mid-temperature sections 6a, 6b contains the heat exchanger 61, 62 respectively, and the low-temperature section 6c contains a steam generating heat exchanger 63. Each of the heat exchangers 61, 62 is preferably of a plate-fin type or fin-tube type of heat exchanger which can present a temperature efficiency equal to or greater than 0.8, preferably greater than 0.9, and the heat exchanger 63 is a conventional gas-to-liquid type of heat exchanger which can evaporate water to steam by heat exchange action with the syngas.

The high-temperature raw syngas in the delivery line HG has a temperature equal to or higher than 900 deg. C. and still possesses a large amount of recoverable sensible heat. The high-temperature gas flowing into the cooling device 6 is brought into heat-transfer contact with the heat exchanger 61 to heat the low-temperature mixture (steam and air) of the low-temperature mixture supply line SA1 up to a high temperature range equal to or higher than 700 deg. C., preferably higher than 800 dge.C., and thereafter, the coarse gas is in heat-transfer contact with the heat exchanger 62 to heat the low-temperature mixture of the low-temperature mixture supply line SA2 up to a middle temperature range equal to or higher than 500 deg. C., preferably higher than 600 deg. C. The cooled syngas effluent from the heat exchangers 61, 62 is successively in heat-transfer contact with the heat exchanger 63 to evaporate the water of the water supply line WS into a low-temperature steam at a temperature ranging between 150 deg. C. and 250 deg. C. The cooled gas is transported from the cooling device 6 to a gas treatment facility 7 through the low-temperature gas delivery line LG and thereafter, delivered to the delivery line FG.

The low-temperature steam of the heat exchanger 63 is fed to the low-temperature steam supply line LS to be mixed with the low-temperature air at an ambient air temperature by the mixing control valve 50, and the mixture is introduced through the supply line SA1, SA2 into the respective heat exchangers 61, 62 in which the mixture is heated to the high or mid-temperature ranges respectively, as set forth above. The mixing ratio (by weight) of high-temperature air to steam is set to be in a range between 2:8 and 5:5.

The mid-temperature mixture of the heat exchanger 62 is introduced into the heat decomposition area of the gasifier 2 through the supply line MMG to thermally decompose the waste into residue and thermal decomposed gas. The high-temperature mixture of the heat exchanger 61 is introduced into the reformer 3 through the supply line HMG to reform the decomposed gas to the raw syngas.

According to this example, all of the syngas cleaned up by the gas treatment device 7 can be supplied to any of energy utilizing facilities such as gas turbine device. In addition, the heat of the high-temperature syngas can be effectively recovered by heating the low-temperature mixture up to the high or mid-temperature, and therefore, the thermal efficiency in the whole system is substantially improved.

Although the present invention has been described as to specific embodiments or examples, it is not limited thereto, but may be changed or modified into any of various other forms without departing from the scope of the invention as defined in the accompanying claims.

For instance, it is understandable that the aforementioned concept of the present invention can be applied to any of coal gasifying systems by replacement of the term "waste" with "pulverized coal", "pulverized coal and primary air" or "coal". In such a case, coal such as pulverized coal is supplied to the gasifying facility 1 by the aforesaid fuel supply means WT, so that the gasifying facility 1 functions as a coal gasifying facility. Thermal decomposed gas obtained by the coal gasification is reformed with use of the high-temperature steam and air and thereafter, cooled and cleaned up by the cooler 6 and gas treatment facility 7. The cleaned up syngas to be supplied to the energy utilizing facility and the steam/air heating device 10.

The type or structure of respective components constituting the steam/air heating device 10, e.g., the valve type of the changeover means 20 and the structure of the splitting area 15 in the aforementioned specific examples may be suitably changed. For instance, a four-way valve mechanism may be employed as the changeover means 20, and the function of the splitting area 15 can be achieved by a configuration of communication passage interconnecting the first and second combustion areas 13, 14 or a mechanism of a flow control valve.

Further, a heat exchanging system as disclosed, e.g., in Japanese Patent Application No. 10-24144 (Japanese Patent Laid-Open Publication No. 11-223482) can be employed as the mechanism for heating steam with use of the high-temperature syngas. Such a heat exchanging system is used as means for heating the low-temperature steam generated in the gas cooler or means for heating the low-temperature steam fed from any steam generator installed outside the system. The steam heated by the heat exchanging system may be further heated up to a temperature equal to or higher than 700 deg. C. by the aforesaid steam/air heating device 10.

Furthermore, the high-temperature syngas in the aforementioned gasifying facility can be supplied directly to a combustion facility such as an industrial furnace or a heat engine, as it is still in a high-temperature condition. In such a case, a combustion fuel may be separately fed to the steam generating means or the steam/air heating device by any fuel supply facility residing outside the system.

Further, the aforementioned cooling device as in FIG. 15, which has the high-temperature, mid-temperature and low-temperature sections may be so constructed as to be divided into two or three coolers, in which a desulfurizing device and the like for removing sulfur or acid from the syngas is interposed between the heat exchanger (62) of the mid-temperature section and the heat exchanger (63) of the low-temperature section.

INDUSTRIAL APPLICABILITY

According to the present invention, an apparatus and method for gasifying the liquid or solid fuel can be provided, which reform the thermal decomposed gas of the gasifier to a relatively high quality syngas.

Further, the gasifying apparatus and method can ensure an amount of heat required for a steam reforming reaction of hydrocarbon in the thermal decomposed gas without provision of internal or external combustion type of heating devices, in accordance with the present invention.

Still further, the gasifying apparatus and method according to the present invention can promote or urge the thermal decomposition and gasification of the liquid or solid fuel while restricting production of soot in the thermal decomposition area.

What is claimed is:

1. An apparatus for gasifying a liquid or solid fuel which has a gasifier for producing a thermal decomposed gas by means of a thermal decomposition reaction of the liquid or solid fuel, comprising:

heating means for heating water or low-temperature steam, and low-temperature air so as to be high-temperature steam and high-temperature air which have a temperature equal to or higher than 700 deg. C.; and feeding means for feeding said high-temperature steam and said high-temperature air to a thermal decomposition area for thermally decomposing the liquid or solid fuel and/or a reforming area for reforming the thermal decomposed gas.

2. An apparatus according to claim 1, wherein the high-temperature steam and air are introduced into said thermal decomposition area and/or said reforming area by said feeding means, so that said thermal decomposed gas is reformed so as to be a high-temperature syngas with an exothermic reaction between the high-temperature air and carbon compound contained in the thermal decomposed gas and with an endothermic reaction between the carbon compound and said high-temperature steam.

3. An apparatus according to claim 1, wherein said high-temperature steam and air are introduced into said thermal decomposition area by said feeding means, so that said liquid or solid fuel is thermally decomposed to produce said thermal decomposed gas with an amount of sensible heat possessed by the high-temperature steam and air and with an amount of heat generated by an exothermic oxidation reaction between said high-temperature air and said fuel.

4. An apparatus according to claim 1, wherein said heating means includes a steam heating device for heating said low-temperature steam up to a temperature equal to or higher than 700 deg. C. so as to be said high-temperature steam, and an air heating device for heating said low-temperature air up to a temperature equal to or higher than 700 deg. C. so as to be said high-temperature air; and wherein said feeding means includes a high temperature steam supply passage for introducing the high-temperature steam into said thermal decomposition area and/or said reforming area, and a high temperature air supply passage for introducing the high-temperature air into said thermal decomposition area and/or said reforming area.

5. An apparatus according to claim 1, wherein said heating means includes mixing means for mixing said low-temperature steam and said low-temperature air together so as to provide a low-temperature mixture of steam and air, and a mixture heating device for heating said mixture up to a temperature equal to or higher than 700 deg. C. so as to be a high-temperature mixture of steam and air; and wherein said feeding means includes a high-temperature mixture supply passage for introducing the high-temperature mixture into said thermal decomposition area and/or said reforming area.

6. An apparatus according to claim 1, wherein said heating means includes a steam heating device for heating said low-temperature steam up to a temperature equal to or higher than 700 deg. C. so as to be said high-temperature steam, an air heating device for heating said low-temperature air up to a temperature equal to or higher than 700 deg. C. so as to be said high-temperature air, and mixing means for mixing said high-temperature steam and said high-temperature air together to provide a high-temperature mixture of steam and air; and wherein said feeding means includes a high-temperature mixture supply passage for introducing the high-temperature mixture into said thermal decomposition area and/or said reforming area.

7. An apparatus according to claim 3, wherein said reforming area is defined in a reformer into which said thermal decomposed gas is introduced, and said feeding means includes passages for introducing said high-temperature air and said high-temperature steam into the reformer and said thermal decomposition area, so that said thermal decomposed gas is reformed to be a high-temperature syngas with an exothermic reaction between the high-temperature air and carbon compound contained in the thermal decomposed gas and with an endothermic reaction between the carbon compound and the high-temperature steam.

8. An apparatus according to claim 2, wherein a cooling device is provided for cooling said high-temperature syngas to a low-temperature syngas, and the cooling device is provided with a heat-exchanger for generating said low-temperature steam by means of an amount of sensible heat possessed by the high-temperature syngas.

9. An apparatus according to claim 2, wherein said heating means is constructed by a cooling device which cools said high-temperature syngas to a low-temperature syngas, and the cooling device is provided with a high temperature heat-exchanger for heating said low-temperature air and/or said low-temperature steam to a high-temperature equal to or higher than 700 deg. C. by means of heat-exchange action of the low-temperature air and/or said low-temperature steam with the high-temperature syngas.

10. An apparatus according to claim 9, wherein said cooling device is further provided with a mid-temperature heat-exchanger for heating said low-temperature air and/or said low-temperature steam to a mid-temperature in a range between 500 deg. C. and 700 deg. C. by means of heat-exchange action of the low-temperature air and/or the low-temperature steam with the high-temperature syngas.

11. An apparatus according to claim 10, wherein a cooling device is further provided with a steam-generating heat-exchanger for generating said low-temperature steam by means of heat-exchange action between water and the high-temperature syngas.

12. An apparatus according to claim 2, wherein gas cleaning means is further provided for cleaning said syngas, and the cleaning means has a syngas supply passage for at least partially feeding a quantity of cleaned up syngas to said heating means so that the heating means heats said water or low-temperature steam and said low-temperature air to a temperature equal to or higher than 700 deg. C. by means of heat generated with a combustion reaction of the syngas.

13. An apparatus according to claim 5, wherein said mixing means includes a mixing control device for allowing a variable setting of a mixing ratio of said steam and air.

14. A method for gasifying a liquid or solid fuel to produce a thermal decomposed gas by means of a thermal decomposition reaction of the liquid or solid fuel:

wherein water or low-temperature steam, and low-temperature air are heated so as to be high-temperature steam and high-temperature air which have a temperature equal to or higher than 700 deg. C.; and wherein said high-temperature steam and said high-temperature air are introduced into a thermal decomposition area for thermally decomposing the liquid or solid fuel and/or a reforming area for reforming the thermal decomposed gas.

15. A method according to claim 14, wherein said high-temperature steam and said high-temperature air are mixed with said thermal decomposed gas, so that an amount of heat required for an endothermic reforming reaction between said high-temperature steam and carbon compound contained in the thermal decomposed gas is partially supplied by an amount of heat generated with an exothermic reaction between the high-temperature air and the carbon compound.

16. A method according to claim 14, wherein said high-temperature steam and air are introduced into said thermal decomposition area, so that said liquid or solid fuel is thermally decomposed to produce said thermal decomposed gas with an amount of sensible heat possessed by the high-temperature steam and air and with an amount of heat generated by an exothermic oxidation reaction between said high-temperature air and said fuel.

17. A method according to claim 14, wherein a mixing ratio of said high-temperature steam and air is set to be a mixing ratio which can be variably controlled.

18. A method according to claim 14, wherein normal air, oxygen or mixture of the normal air and oxygen is used as said low-temperature air.

19. A method according to claim 14, wherein said thermal decomposed gas takes a steam reforming reaction in said reforming area and thereafter, takes a heat-exchange action with said low-temperature steam and/or said low-temperature air to heat the low-temperature steam and/or the low-temperature air up to said temperature equal to or higher than 700 deg. C.

20. A method according to claim 19, wherein said thermal decomposed gas flier takes a heat-exchange action with said low-temperature steam and/or said low-temperature air to heat the low-temperature steam and/or the low-temperature air up to a temperature in a range between 500 deg. C. and 700 deg. C.

21. A method according to claim 20, wherein said thermal decomposed gas further takes a heat-exchange action with water to generate said low-temperature steam.

22. A method according to claim 14, wherein said thermal decomposed gas takes a steam reforming reaction in said reforming area and then, undergoes a gas treatment process for removing foreign matters or harmful substances therefrom so as to be a cleaned up syngas and thereafter, the cleaned up syngas is delivered to heating means for heating said water or low-temperature steam and said low-temperature air as well as delivered to a combustion device of a combustion facility or engine residing outside the apparatus; and wherein said water or low-temperature steam and said low-temperature air are heated in the heating device by heat generated with a combustion reaction of the cleaned up syngas.

23. A method according to 22, wherein said cleaned up syngas is supplied to said combustion device so as to be used as a main fuel thereof.

24. A method according to 22, wherein said cleaned up syngas is supplied to said combustion device so as to be used as an auxiliary fuel to be added to a main fuel of the combustion device and/or combustion air thereof.

25. A method according to claim 22, wherein said thermal decomposed gas flows through a cooling device for cooling the thermal decomposed gas after taking said steam reforming reaction and before undergoing said gas treatment process; and wherein the cooling device evaporates a quantity of water so as to generate said low-temperature steam by means of sensible heat possessed by the thermal decomposed gas, or heats said low-temperature steam and/or said low-temperature air by means of the sensible heat of the thermal decomposed gas.

26. A method according to claim 14, wherein waste, coal, biomass fuel or heavy oil is used as said liquid or solid fuel.

27. A waste gasifying system comprising an apparatus for gasifying a liquid or solid fuel according to claim 1.

28. A coal gasifying system comprising an apparatus for gasifying a liquid or solid fuel according to claim 1.

29. A gasification and power generation system comprising an apparatus for gasifying a liquid or solid fuel according to claim 1 and a electric power generator operated with use of a syngas produced by said apparatus.

* * * * *